United States Patent [19]
Korelitz et al.

[11] 3,867,616
[45] *Feb. 18, 1975

[54] AUTOMATED DESIGNING

[75] Inventors: Theodore H. Korelitz, Waban; Alvin C. Brodie, Dover, both of Mass.

[73] Assignee: The Badger Company, Inc., Cambridge, Mass.

[ * ] Notice: The portion of the term of this patent subsequent to Jan. 18, 1989 has been disclaimed.

[22] Filed: Sept. 14, 1971

[21] Appl. No.: 180,318

Related U.S. Application Data

[63] Continuation-in-part of Ser. No. 767,891, Sept. 3, 1968, Pat. No. 3,636,328, Continuation-in-part of Ser. No. 419,466, Dec. 18, 1964, abandoned, Continuation-in-part of Ser. No. 223,324, Sept. 13, 1962, abandoned.

[52] U.S. Cl. ................ 235/151.1, 340/172.5, 444/1
[51] Int. Cl. ............................................ G06b 15/46
[58] Field of Search ... 235/151, 150, 151.1, 151.11; 444/1; 340/172.5

[56] References Cited

UNITED STATES PATENTS 3,443,075 5/1969 Gloess ................................ 235/151
3,488,479 1/1970 Keyes et al. ...................... 235/151.1
3,519,997 7/1970 Bernhart et al. .................. 235/151
3,534,396 10/1970 Hart et al. .................... 340/172.5 X
3,636,328 1/1972 Brodie et al. .................... 235/151.1

*Primary Examiner*—Joseph F. Ruggiero
*Attorney, Agent, or Firm*—Sol B. Wiczer

[57] ABSTRACT

An automated designing system which includes the steps of orienting mechanical units into a plot plan and assembling interconnecting point orientation measurement data and specification data of units to be interconnected in ordinary draftman's terms, programming a computer to convert data in this form to a normal coded algorithmic form acceptable to a computer, imposing design-significant limits upon the computer operation, operating the computer to produce within its memory linear-significant data interconnecting elements of said plan, printing out a portion of the said data in selected views upon a cathode ray tube operative to be modified by a light pencil to program corrections and modifications into the computer, and then converting said data from the memory of said computer to visible form either directly or from intermediate storage form.

11 Claims, 42 Drawing Figures

INVENTOR
ALVIN C. BRODIE
THEODORE H. KORELITZ
BY
Sol B. Wiczer
ATTORNEY

INVENTORS
ALVIN C. BRODIE
THEODORE H. KORELITZ
BY Sol B. Wiczer
ATTORNEY

INVENTORS
ALVIN C. BRODIE
THEODORE H. KORELITZ
BY Sol B Wiczer
ATTORNEY

INVENTORS
ALVIN C. BRODIE
THEODORE H. KORELITZ
BY
Sol B Wiczer
ATTORNEY

INVENTORS
ALVIN C. BRODIE
THEODORE H. KORELITZ
BY Sol B. Wiczer
ATTORNEY

EQUIPMENT REPRESENTATION ON INPUT CARDS

| IDENT. CODE | CENTERPOINT | | | DIMENSIONS | | |
|---|---|---|---|---|---|---|
| | X | Y | Z | X | Y | Z |
| A01Z | 672 | 688 | 1456 | 172 | 172 | 2912 |
| M01Y | 1272 | 132 | 648 | 148 | 156 | 148 |
| T01Y | 384 | 640 | 144 | 48 | 832 | 48 |
| T02Y | 1008 | 744 | 554 | 88 | 1040 | 88 |
| T03Y | 1512 | 648 | 168 | 60 | 848 | 60 |
| P01Y | 544 | 1480 | 80 | 120 | 272 | 160 |
| P02Y | 808 | 1480 | 80 | 120 | 272 | 160 |
| P03Y | 1072 | 1480 | 80 | 120 | 272 | 160 |
| P04Y | 1320 | 1480 | 56 | 84 | 272 | 84 |
| P05Y | 1396 | 1480 | 56 | 84 | 272 | 84 |

FIG. 6

EQUIPMENT ALGORITHMS AFTER CONVERSION AS STORED IN COMPUTER MEMORY

| IDENT. | $X_{MIN.}$ | $Y_{MIN}$ | $Z_{MIN.}$ | $X_{MAX}$ | $Y_{MAX}$ | $Z_{MAX}$ |
|---|---|---|---|---|---|---|
| 41013 | 05860 | 06020 | 00000 | 07580 | 07740 | 29120 |
| 54012 | 11980 | 07040 | 05740 | 13460 | 11600 | 07220 |
| 63012 | 03600 | 02240 | 0120 | 04080 | 10560 | 01680 |
| 63022 | 09640 | 02240 | 05100 | 10520 | 12640 | 05980 |
| 63032 | 14820 | 02240 | 01380 | 15420 | 10720 | 01980 |
| 57012 | 04840 | 13440 | 00000 | 06040 | 16160 | 01600 |
| 57022 | 07480 | 13440 | 00000 | 08680 | 16160 | 01600 |
| 57032 | 10120 | 13440 | 00000 | 11320 | 16160 | 01600 |
| 57042 | 12780 | 13440 | 00240 | 13620 | 16160 | 00880 |
| 57052 | 13540 | 13440 | 00240 | 14380 | 16160 | 00880 |

FIG. 7

INVENTORS
ALVIN C. BRODIE
THEODORE H. KORELITZ
BY
ATTORNEY

INVENTORS
ALVIN C. BRODIE
THEODORE H. KORELITZ
BY Sol B. Wiczer
ATTORNEY

INVENTORS
ALVIN C. BRODIE
THEODORE H. KORELITZ
BY Sol B. Wiczer
ATTORNEY.

INVENTORS
ALVIN C. BRODIE
THEODORE H. KORELITZ
BY
Sol B. Wiczer
ATTORNEY

| COORDINATES OF POINTS | | | | | | | | | | | | | | |
|---|---|---|---|---|---|---|---|---|---|---|---|---|---|---|
| PATH | PATH | POINT A | | | POINT: FIRST INTERMEDIATE | | | POINT SECOND INTERMEDIATE | | | POINT B | | | |
| | | X | Y | Z | X | Y | Z | X | Y | Z | X | Y | Z | |
| 1 | $A - A_{10} - A_4 - A_5 - B$ | 117 | 240 | 42 | 290 | 240 | 42 | 290 | 352 | 42 | 290 | 352 | 550 | |
| 2 | $A - A_{10} - A_1 - A_2 - B$ | 117 | 240 | 42 | 290 | 240 | 42 | 290 | 240 | 550 | 290 | 352 | 550 | |
| 3 | $A - A_{11} - A_6 - A_5 - B$ | 117 | 240 | 42 | 117 | 352 | 42 | 290 | 352 | 42 | 290 | 352 | 550 | |
| 4 | $A - A_{11} - A_7 - A_3 - B$ | 117 | 240 | 42 | 117 | 352 | 42 | 117 | 352 | 550 | 290 | 352 | 550 | |
| 5 | $A - A_{12} - A_8 - A_2 - B$ | 117 | 240 | 42 | 117 | 240 | 550 | 290 | 240 | 550 | 290 | 352 | 550 | |
| 6 | $A - A_{12} - A_9 - A_3 - B$ | 117 | 240 | 42 | 117 | 240 | 550 | 117 | 352 | 550 | 290 | 352 | 550 | |

FIG. 13

| EQUIPMENT TABLE | | | | | | |
|---|---|---|---|---|---|---|
| EQUIPMENT CODE | $X_{MIN.}$ | $Y_{MIN.}$ | $Z_{MIN.}$ | $X_{MAX.}$ | $Y_{MAX.}$ | $Z_{MAX.}$ |
| P-81-X | 130 | 228 | 27 | 165 | 252 | 57 |
| M-26-Z | 258 | 340 | 12 | 262 | 364 | 600 |

FIG. 12

INVENTORS
ALVIN C. BRODIE
THEODORE H. KORELITZ
BY Sol B. Wiczer
ATTORNEY

BLOCKS FORMED BY SEGMENTS OF PATHS
LINE DIAMETER = 10 INCHES

| PATH NO. | SEGMENT NO. | $X_{MIN.}$ | $Y_{MIN.}$ | $Z_{MIN.}$ | $X_{MAX.}$ | $Y_{MAX.}$ | $Z_{MAX.}$ |
|---|---|---|---|---|---|---|---|
| 1 | $A_{10}$ | 109 | 232 | 34 | 298 | 248 | 50 |
| 1 | $A_4$ | 282 | 232 | 34 | 298 | 360 | 50 |
| 1 | $A_5$ | 282 | 344 | 50 | 298 | 360 | 558 |
| 2 | $A_{10}$ | 109 | 232 | 34 | 298 | 248 | 50 |
| 2 | $A_1$ | 282 | 232 | 34 | 298 | 248 | 558 |
| 2 | $A_2$ | 282 | 232 | 542 | 298 | 360 | 558 |
| 3 | $A_{11}$ | 109 | 232 | 34 | 125 | 360 | 50 |
| 3 | $A_6$ | 109 | 344 | 50 | 298 | 360 | 50 |
| 3 | $A_5$ | 282 | 344 | 50 | 298 | 360 | 558 |
| 4 | $A_{11}$ | 109 | 232 | 34 | 125 | 360 | 50 |
| 4 | $A_7$ | 109 | 344 | 34 | 125 | 360 | 558 |
| 4 | $A_3$ | 109 | 344 | 542 | 298 | 360 | 558 |
| 5 | $A_{12}$ | 109 | 232 | 34 | 125 | 248 | 558 |
| 5 | $A_8$ | 109 | 232 | 542 | 298 | 248 | 558 |
| 5 | $A_2$ | 282 | 232 | 542 | 298 | 360 | 558 |
| 6 | $A_{12}$ | 109 | 232 | 34 | 125 | 248 | 558 |
| 6 | $A_9$ | 109 | 232 | 542 | 125 | 360 | 558 |
| 6 | $A_3$ | 109 | 344 | 542 | 298 | 360 | 558 |

FIG. 14

INVENTORS
ALVIN C. BRODIE
THEODORE H. KORELITZ
BY Sol B. Wiczer
ATTORNEY

INVENTOR
ALVIN C. BRODIE
THEODORE H. KORELITZ
BY
Sol B Wiczer
ATTORNEY

PLOT PLAN EQUIPMENT LOCATION

| EQUIP. CODE & NO. | MS-401 | MS-417 | MS428A | YS-1 | YS-3 | A-1 | A-2 |
|---|---|---|---|---|---|---|---|
| HORIZONTAL OR VERTICAL | H | H | H | V | V | V | V |
| ANGLE: FOR HOR. OR SKEWED VERT. | 270° | 315° | 180° | | | | |
| DIMENSION | 10'0" | 10'8" | 8'0" | 10'0" | 20'0" | 6'0" | 20'0" |
| DIRECTION | S | W | E | E | E | W | E |
| LOCATED FROM | YS-1 | B-1 | A-1 | W.P. | YS-1 | YS-1 | A-1 |
| DIMENSION | 8'6" | 2'6" | 4'6" | 12" | 10'0" | 10'0" | 10'0" |
| DIRECTION | E | N | S | S | N | S | S |
| LOCATED FROM | YS-1 | B-1 | A-1 | W | MS-401 | YS-3 | YS-3 |

N = NORTH
S = SOUTH
E = EAST
W = WEST
H = HORIZONTAL
V = VERTICAL

FIG. 16

INVENTORS
ALVIN C. BRODIE
THEODORE H. KORELITZ
BY Sol B. Wiczer
ATTORNEY

INVENTORS
ALVIN C. BRODIE
THEODORE H. KORELITZ
BY
Sol B. Wiczer
ATTORNEY

LOGIC FLOW DIAGRAM FOR PRE-PROCESSOR

INVENTORS
ALVIN C. BRODIE
THEODORE H. KORELITZ
BY
Sol B. Wiczer
ATTORNEY

PATENTED FEB 18 1975

3,867,616

SHEET 20 OF 24

INVENTORS
ALVIN C. BRODIE
THEODORE H. KORELITZ
BY
Sol B. Wiczer
ATTORNEY

EQUIPMENT DATA SHEET

HORIZONTAL CYLINDRICAL TANK WITH SADDLE SUPPORT

| | | | | | | | |
|---|---|---|---|---|---|---|---|
| EQUIP. CODE & NO. | MS-401 | MS-428A | MS-417 | | | | 1-7 |
| ℄ ELEVATION | 106' 0" | 144' 6" | 108' 4" | | | | 8-16 |
| DIAMETER | 4'-0" | 3'6" | 6'6" | | | | 17-24 |
| LENGTH: BL TO B.L. | 15' 0" | 12' 0" | 16' 0" | | | | 25-33 |
| INSUL. THKN. | 2" | | 2" | | | | 34-35 |
| HEAD LOCATION | E | N | N.W. | | | | 36-38 |
| HEAD TYPE | F & D | HEM. | F. & D. | | | | 39-42 |
| HEAD LOCATION | W | S | SE | | | | 43-45 |
| HEAD TYPE | FLG | F & D | F & D | | | | 46-49 |
| SADDLE TYPE | M45-H | M45-H | M 44-H | | | | 50-56 |
| DIM B.L. TO ℄ SADDLE | 18" | 18" | 20" | | | | 57-64 |
| DIM ℄ SADDLE TO ℄ SADDLE | 12'0" | 9'0" | 12'8" | | | | 65-72 |
| SUPPORT LEVEL | 100'-0" | 140'0" | 100'0" | | | | 73-79 |

℄ = CENTER LINE
B.L. = BEND LINE

FIG. 20

INVENTORS
ALVIN C. BRODIE
THEODORE H. KORELITZ
BY Sol B Wiczer
ATTORNEY

INVENTORS
ALVIN C. BRODIE
THEODORE H. KORELITZ
BY
Sol B Wizer
ATTORNEY

INVENTORS
ALVIN C. BRODIE
THEODORE H. KORELITZ
BY Sol B. Wiczer
ATTORNEY

*LOGIC FLOW DIAGRAM FOR PIPE MATERIALS SUMMATION*

AUTOMATED DESIGNING

This application is a continuation-in-part of our copending application, Ser. No. 767,891, filed Sept. 3, 1968 entitled AUTOMATIC DESIGNING, and now U.S. PAT. No. 3,636,328; in turn a continuation-in-part of our copending application, Ser. No. 419,466, filed Dec. 18, 1964, entitled AUTOMATIC DESIGNING, now abandoned; in turn a continuation-in-part of our copending application filed Sept. 13, 1962, bearing Ser. No. 223,324, entitled AUTOMATED DESIGNING, now abandoned.

Said parent applications relate to linear design including compilation of orienting data for origination and destination points, and the structural elements associated therewith forming part of a plot plan to be interconnected; programming a computer with such orienting data and with limits useful to produce linear-significant interconnecting data; and converting such data to visibly useful form.

According to the method aspect of the invention, as described and claimed in our parent applications, the draftsman needed to apply the steps of orienting the several units or structural elements into a plot plan, usually three-dimensionally. He measured the orienting data of such units and points thereon to be interconnected. He then converted this orienting plot plan data to coded or algorithmic form acceptable to a computer. Then, after orienting such plot plan elements within the memory of the computer, and imposing design-significant limits upon the computer operation, the computer is operated to produce within its memory linear-significant data interconnecting these elements of the plot plan, which is then finally printed out to visible form or stored as data in a form that could be printed out.

In one aspect, the present invention is an improvement over our parent copending application in substantially simplifying the interconnecting of units of a plot plan by piping in a manner to require no more than the elementary skill of a piping draftsman following his usual practice of transferring such available data, significant to identify and orient various units to be assembled by piping, into a composite structural drawing such as a chemical plant, petroleum refinery or the like. To accommodate the normal practice of the draftsman, the computer is programmed to accept the data in the form a skilled draftsman can usually provide it and then convert such data to a form which the computer needs to convert such plot plan to a visibly complete drawing in which the several units of the plot plan are visibly interconnnected by piping to a complete or semi-complete plant.

In design work upon piping to interconnect several units of a plant, changes are often needed and the lines are continuously modified to accommodate several design needs. For example, capacity and flow direction may be modified. Valves, couplings, expansion elements, gauges and the like may need to be added, relocated or withdrawn, operations which are best applied to a semicompleted piping design. Finally, corrections as well as more fundamental changes in the design may be desired.

In the practice of the invention described in our parent applications, the available orienting data measured from the plot plan, as significant of the type of orientation of each of the units to be assembled by piping, was first compiled into tabulated form and then was required to be coded both to a form significant of the said identifying and orienting data and a form acceptable to the computer. That operation to so convert his data made far greater demands upon the elementary skills of the draftsman than are usually available, requiring of the draftsman mathematical computations and unit conversions of the measurement data involving a great expenditure of his time; and greatly complicating the draftsman-designer's job.

According to a first aspect of this invention, therefore, the measurement and equipment specification data taken from a plot plan is assembled upon questionaire forms, in the familiar terms ordinarily used and recognized by the design draftsman in ordinary piping design work. The computer, however, is specially programmed and accepts the data in that simplified familiar draftsman's language and converts it to its own acceptably-coded algorithmic form for operation of the computer thereon. Thus the computer is made to do its own interpretation of the usual draftsman's symbols for completing the piping design. This both allows the ordinary draftsman to complete a drawing from a plot plan using the computer in that manner described in our parent application and with greater time saving, but requires little or no specialized training for a design draftsman to make computerized drawings.

In a second aspect of this invention the design draftsman's job is further simplified by first making a preliminary design without extensive preliminary study, merely by feeding the charted data into the computer together with the usual imposed limits to be placed upon teh computer as reviewed below. The completed drawing, more usually portions thereof, are then visibly printed out as a graphic display of the piping drawing on the face of a cathode ray tube in various selected views. Such cathode ray tube is described in detail in the U.S. Pat. No. 3,394,366,here incorporated by reference to supply details of its construction. The graphic system hereof, of which the cathode ray tube is a predominant element, as described, is a type that allows editing with a light pencil of any of the displayed views and is used in cooperation with the cathode ray printout of the piping design generated in the memory of the computer. Thus, any view of the design may be generated upon the face of the cathode ray tube and it may be edited, various equipment pieces or piping lines, connections, pumps, valves, including nozzles, etc. may be emplaced, removed and revised, including notations thereon i.e., piping elements, pieces and lines may be added or removed according to the final design desired. It is the design draftsman in his usual skill who effects the editing of the graphic orientation of the various sections of the piping, drawing or modifying the lines with a light pencil upon the graphic tube whereby, in cooperation with the computer, the ultimate print out of the drawings will bear these corrections in any of the views as needed. Such graphic systems are available commercially from several manufacturers such as the IDI System distributed by Information Displays, Inc., 333 North Bedford Road, Mount Kisco, New York, 10549, who among others, distribute operating manuals and typical programming for operation of the graphic system published by this manufacturer. Example III, below, illustrates the operation of a typical interactive technique to graphically modify a line description of a series of line diagrams of the type described herein produced by automatic data processing.

In a further aspect of the invention, the computer can, as pointed out in our parent applications, sum up pipe lengths, weights and elements such as controlling elements, valves, elbows, unions, T's, reducers and the accumulation of that data which is essential in preparing a completed piping design. These summations can be further categorized by size of pipe or fabrication material.

The invention further includes the combination with the orienting data and programmed limits upon the linear-significant interconnecting data produced from said data within said limits in the memory of the computer, with or without additional storage data means, of means to convert said data to drawings or other visible form in any desired view, as taught in our parent applications. Other important steps for the method and combination of apparatus units to operate this method will be inherent in the ensuing description.

Particularly, following the general method steps of the invention, the computer mathematically determines and produces data significant of limited linear passageways interconnecting several or numerous three-dimensionally arranged points which have been further mathematically programmed into the computer, whereby said linear passageway data can be availably stored or reduced to drawings such as by an X-Y plotter or other commercially available drafting machine which forms lines drawn between the said points and according to the computer programmed limits, in any desired view. Thus, according to this invention, visible lines such as drawings may be formed, or data significant of said visible lines of drawings can be formed as rapidly as isolated data points and connective limits can be cooded and fed into the memory of a computer, by calculations i.e., computing of linear passageway data significant of lines, computed by the computer as its usual high speed and then converted to visible line form by, for example, operation of a drafting machine such as an X-Y plotter thereon.

It is known in the art to directly copy dimensionally-oriented points from a drawing in sufficient numbers to approximate lines, such data being then placed upon punch cards or tape in a form readable into the memory of a computer, and then passed or stored in the memory of a computer from which may be directly obtained and reproduced the original drawing from which it was copied. For instance, a drafting machine, Universal Drafting Machine Company, "Orthomat" or an X-Y plotter, are known units capable of being operated by punchcard or tapes upon which such data can be emplaced, the drawing being reproduced by a continuously operating stylus forming the lines of a drawing. Such system is a mere copying and reproducing system, but not an original design system. The present system develops designs in contrast to merely copying already developed designs.

Thus, the invention of our parent application is a marked improvement over those prior practices in that the separate elements to be interconnected, integrated or developed into a composite design are first three-dimensionally oriented into a plot plan, a rough element orientation or arrangement plan from which such elements are then integrated by the computer into the final design. The significant dimensional points oriented first on the plot plan are converted algorithmically to a form acceptable to a computer, stored within the memory of the computer only as isolated data points, each oriented in space, two or three dimensionally with respect to a common origin point. Certain programmed limits are imposed upon the possibly available lines and the computer is then actuated to mathematically indicate, such as by computing, a linear-significant series of data points to interconnect the several isolated originally-programmed points within the imposed limits. The linear-significant data point series follows a path between the originally oriented points, according to whatever limiting rules have been further supplied to the computer, thus constraining the linear data-point paths between the original points to any further desired limits.

Such limiting path or passageway rules may be, for example, that the paths interconnecting the original points to be developed by the computer should be the shortest practical path between the points that can be taken within certain other limits. Another rule may be that such path shall comprise a space limit for the rest, so that no path may spacially interfere with, be too close to, or be intersected one by another; nor be so directed as to pass too close to or be interrupted by or suffer practical operational interference by the presence of some other path or apparatus unit. Another limit may be that the paths themselves are constrained to pass between the original points to be connected while each lies parallel to one or more of the X, Y and Z axes, an effect that allows an arbitrarily imposed order and symmetry among the paths. Another limit may be that all of the paths are arbitrarily restricted never to descend below, pass above or beyond a certain height or boundary i.e., to keep the lines compacted or expanded, or an arbitrarily fixed area clear of any lines passing therethrough. Thus, the lines may also be further so limited that no path may be separated farther, or approach closer, than a fixed distance, i.e., number of inches or feet to another, to provide compactness or working space for installation of pipe and repairs thereof, or to avoid having any interchanging effect; for instance, radiation, heat transfer, magnetic, inductance or electrically conductive or interferring effect one path or pipe upon the next. There may be imposed a minimum length of passage in any one direction, or in the case of piping, a minimum length of single directional passage from a fitting, elbow bend, flange, tee, coupling, valve or nozzle, etc. It may be that a further desired limit is that a path shall have a minimum number of bends in passage to interconnect the original points. Conversely, it could be required that most of the paths or a large portion of each, must pass close to each other for convenience of assembly, bracing, support or servicing of pipes, etc. Other oftime arbitrary or even capricious limits can be imposed, as desired, even taking advantage of rules of logic, mechanical engineering or electrical building codes, specification limits, etc. The great mathematical precision, flexibility and orderliness available from a computer can be used to limit, for instance, the order of development of the paths to an arbitrary sequence, starting first with the longest or shortest, or the longest in an arbitrary X, Y or Z direction, etc.

The completely connected design data developed in the computer and either retained there or upon memory storage discs, is then converted to visible form, preferably drawings, or a stored form i.e., punch cards or tape, which can be converted to drawings. It will be understood that the present invention produces a visible design starting from a plot plan from which a computer is programmed with few or many points to be interconnected, all developed from the original plot plan of initial measurements and spatial arrangement of units comprising the ultimate design into which they are to be intergrated, often in combination with previously stored dimensional elements already in the memory of the computer or available from other, such as a disc storage means; for example, an IBM 2311 Disc Storage Drive, magnetic tape, punch cards as typical sources of stored data. Such sources supply algorithmically few or many oriented points to be interconnected. Most usually each path to be computed has only an origin and destination point. The limits to be placed upon the paths by which such points are to be interconnected is also programmed into the memory of the machine. The computer is then caused to compute a linear series of data points significant of the passageway to interconnect the several points thus programmed. The computer produces such linear data in a useful form, retaining in its memory or producing in visible typewritten or other tabulated form the data. It may also produce such data output magnetically emplaced, or punched, on tape; or produced in punchcard form; or restored back into disc storage drive from which it can ultimately be reproduced again in any of said forms; or it may even be returned to the memory of the computer, the computer data being thus useful for storage and subsequent use or immediate conversion to the visible form such as conversion to the visible lines of a drawing by supplying the data to a commercial drafting machine, as mentioned above, typically an X-Y plotter.

Such drafting machine may be directly combined with the computer for directly operating upon the computed data, converting the point series passageway data in the memory of the computer into drawings graphically illustrating the originally oriented points to be interconnected and the computed interconnecting lines. The computer can also be caused to draw regular geometric shapes for emplacement and drafting in oriented position in conjunction with the points to be interconnected hereby. For instance, the computer can draw circles, cylinders, rectangles and the like, oriented according to given dimensions as well as with respect to center points, connecting nozzles and the like. Since the computer can very readily have any part of linear data, for example the data points, taken for any direction suppressed, it is possible to constrain the computer to supply data significant only of the lines which can appear to be in a single plane i.e., the X-Y plane; or only the lines which may appear in an X-Z plane; or only the lines which may appear in a Y-Z plane and each at a selected dimension level (or any intermediate plane). It is possible within the usual flexibility of the computer to produce data three dimensionally as a combination of all three planes; so, for instance, the drawing can be an isometric view. Hence, the data thus produced by the computer and supplied for operation of the drafting machine such as the X-Y plotter can produce any given view; for instance, a plan view, i.e., a sheet of drawings illustrating the path interconnecting originally programmed points, according to the further limits placed thereon as programmed into the machine in any view such as, for example, a plan view corresponding to lines lying in the X-Y plane; and/or a side view corresponding to lines lying in the Y-Z plane; and/or a front elevation corresponding to lines lying in the X-Z plane; or an isometric view, according to conventional engineering drafting practice. Indeed, with the greater computer flexibility by standard analytical geometry methods, the data can be made available for illustrating such system lying in any arbitrarily selected plane.

Among the immediate practical applications of this system is the production of a normal engineering piping drawing showing the location of an arrangement of ducts or pipes connecting, for example, numerous operating units of a system for fluid passage between operating units. For example, a typical chemical or fluid handling process may comprise a tower for distillation (extraction, vapor contact and the like) which has an inlet for materials, usually at one end (or other suitable site upon the unit) and outlets (or inlets) for treated or treating materials at the other. Such system may further have pumps, heat exchangers, refrigeration units, compressors, cooling or wash water supply lines, steam or air power lines, chemical supply tanks, storage tanks and the like, all of which need to be interconnected into a unitary operating system for fluid passage between its various units with piping.

According to the invention as earlier described in our parent applications, the preliminary step consists of forming a plot plan in which elements to be incorporated in the design are three-dimensionally oriented. The position of such elements with respect to an origin as in typical design drafting is laid out and the critical elements, the dimensions of the units and their position in the system is measured and converted to algorithmic form acceptable to a computer. Such initial data passed to the computer specifies the location, spacing and approximate dimensions of the several operating units to be integrally designed into the system in X, Y and Z directions with respect to a common origin from which all may be measured. This initial data locates, spaces and dimensions any of the units with respect to the others.

As a next step, the three-dimensional location of the exact line or piping connection point or "nozzle" as it is commonly termed in the art, is oriented into the plot plan from which it may then be transferred into the memory of the computer for each of the units, further reading and identifying into the memory of the computer which units of the system are to be interconnected at these points.

Finally, limitations are placed in the memory of the computer indicative of the paths to be followed along lines mentioned above; for example, (a) that the longest or most extensive line or pipe is to be computed first; (b) that one pipe shall not intersect the next; (c) that one pipe shall not come closer or, for most of its length, not be separated more than a certain number of inches either from the last computed pipe or from any unit oriented into the system; (d) that the pipes shall pass from point to point parallel to X, Y or Z axes; (e) in the minimum length of path; (f) with the minimum number of bends, and the like; (g) that each pipe or line shall be disposed according to standard engineering rules of design; and (h) that local laws, or industry-wide standards of building conditions, rules, trade practices applicable to the particular type of plant will be observed.

The computer will then mathematically interconnect the so-called nozzles of the units to be interconnected, calculating the paths by analytical geometrical procedure within the three-dimensionally arranged framework, observing within the limits as thus outlined in its memory. Thus, critical starting point data is placed into the memory of the computer, but the computer-plotter system, within its imposed limits of the character described, has a free hand in the actual piping or line layout, the specific pathways, or their equivalent in mathematical data linearly interconnecting the orientation points.

According to the present improvement, a designer's time is substantially minimized by providing two questionaire forms upon which data is accumulated for the system, both being in terminology and format which is familiar to the designer and the designer may transcribe the data to spaces prepared upon such questionaire forms as he pleases. The forms are of two types:

A first form allows listing of location information and this form accepts such orientation data of units to be assembled by piping directly from the plot plan, as described below, without any conversion to provide a record of numerical measurements directly obtained from the plot plan to orient the units.

A second form is intended to record the known or measured size and shape of the units as oriented in the plot plan. The second form may comprise a series of several sheets, each summarizing different units as a composite, such as a sheet listing pumps; a second sheet listing heat exchangers; and a sheet listing storage tanks, and the like; so that each sheet usefully lists each particular kind of apparatus, presenting thereon sizes for the several units of that class including the orientation of each in the system.

The several sheets are then converted to tape or punchcard form to be supplied to the computer. This data on pumps, for example, assembled upon a particular form sheet becomes available for each pump from a different card which may classify the dimensional data or specification data defining each specific pump so that the composite may be a summary of several pumps whose service data is made available from card data to which the draftsman further supplies the graphical orientation data available from the plot plan to indicate its position for placement in the system. Moreover, the several bits of information that are applied to the form may be accumulated in different time sequences as they become available; for instance, the type and specifications of a particular pump may be taken from card data when it is available as extracted from various files to supply information, categories or the like; and the location information is obtained from the plot plan when it is available. Consequently, the step of preparing the format comprises a series of acts necessary to assemble as composite written data the various bits of information needed for such format, which is transposed to data or punchcard form for supply to the computer. The computer, or a minicomputer associated with the main computer, for exchange of data is first programmed with a preprocessing program called the "pre-processor" and that program is a programming modified or characterized by its ability to accept the ordinary draftsman's measurement or identification data symbolic of each piece of equipment, its size and orientation, as needed, for final design into computer-acceptable coded form.

Consequently, according to the present invention, the main computer directly or indirectly through a minicomputer is coded with the ordinary plot plan data in ordinary draftsman's language but which becomes automatically converted by the pre-processor to the coded form needed by the main computer to effect the ultimate linear composition of data significant of the completed design as described.

The pre-processor also effects a checking of the data both for accuracy and completeness so that the main computer then becomes programmed with accurate plot plan data in useful coded computer language which was originally made available entirely in ordinary draftsman's language, whereby the computer operated as described in our parent applications as substantially reproduced below can graphically reproduce in any view all or portions of the piping diagram as a graphic display upon a cathode ray tube.

According to another aspect of the present invention, the computer-formed drawing or selected portions thereof is reproduced upon the cathode ray tube together with marginal notations comprising data from several sources to aid the designer in making corrections, insertions or deletions replacing structural elements such as piping, valves, etc., as well as reorienting or modifying external elements and interconnecting piping therewith.

The computer drafting system, thus operated, and as a third aspect, can also be used to measure or sum up the lengths of the calculated pipe; or count the numbers of valves, fittings, tees, flanges, elbows, bends, reducers, unions, couplings; or can add or calculate the weight and lengths of the pipe as a total; sum up the price of any particular kind of unit, elbow, valve, flange, etc; and maintain a total cost or weight or other simple arithmetical or summation of data useful with a piping layout and use of a computer therewith.

Many of the minor structural elements as listed here may, according to the present invention, be inserted in design correction of each view as it is presented graphically upon the cathode ray tube by inserting with light pencil to show in draftsman's code the insertion of a valve, fitting, union, pump or the like, including changes of piping, if any, as the draftsman completes manually the corrections of each view. These additional elements together with whatever summations of piping data, for forming an inventory of supplies needed to complete the design become assembled in the memory of the computer to include the changes the draftsman has made so that on final printing all formation data forming such inventory is available in separate print out.

Of course in an electrical system, lengths of wire, connectors, insulators, transformers and the like, typical of that kind of electrical system; or sprinkler for a fire extinguishing system; tanks and other standard processing units in a dairy system; terminal units in an air conveyor system; sewer inlets and outlets; turbines, relays, automatic switching systems, each comprising units typical of the kind of interconnected system being designed, are cost or number estimated.

The invention, moreover, has other uses than drafting or formation of linear-data points for conversion to a piping diagram (drawing). It is suitable for other illustrative purposes to mathematically lay out data points in draftsman's language significant of any drawing, two or three dimensional, in any selected view, including lines and points on any plane at selected angles corrected at a semi-final stage. For intance, we contemplate such application of this method and apparatus as for reproducing weather data in linear diagram form; producing civil engineering drawings such as highway cut and fill diagrams; graphically checking automatic machine tool programs; diagramming of water-oil barrier studies such as in secondary air recovery systems; graphically diagramming printed or other fixed line electrical circuits and the like; piping of chemical plants and oil refineries; piping of power plants including atomic energy power plants; piping of waterworks and filtration plants including seawater desalting systems; piping of steam, oil, gas and water distribution systems; air conditioning, heat and plumbing systems; marine power plants including ship piping and aircraft and missile systems; submarine piping; fire sprinkler systems; dairy processing; liquid rocket fuel ducting; air conveyor systems; telephone and electrical lines; underground sewer, water supply, electrical and gas lines; the latter to approximate street locations as well as interconnecting points with various trunk lines, and the like. Particularly the system is capable of directing the ducting through certain areas, for instance, under definitely laid out streets while avoiding passage through buildings, basements, etc.

Thus, the system embraces the computing, linearly, of the paths in a series of points as interconnecting lines, conduits or pipes between graphically oriented points, the linear computation observing any superimposed limits or rules that have been placed in the memory of the computing machine, and the reproducing of such linear data in a manner whereby it may be visibly illustrated such as by drawings in any of the many views by an X-Y plotter or the like which have been developed by additions and modification from a semi-completed working stage drawing upon a cathode ray tube to the final design form. Moreover, the original data was supplied with no need for extreme computations and coding from the original plot plan data.

For an improved understanding of this invention to describe its operation in practical detail, the accompanying drawings are presented. It will be understood, however, that they are only for illustrative purposes to explain the practical operation and use of the invention for producing engineering piping drawings; or data significant thereof, including operation of an X-Y plotter which will visibly print the mathematically pre-formed data into drawings.

FIG. 5 is a diagram illustrating isometrically a plot plan outline of units to be interconnected and the measurement of distances for identification of units of the system of which FIGS. 2, 3 and 4 are ultimate drawings in which the system has been interconnected;

FIG. 6 is a table illustrating according to our parent application the manner of coding of equipment units upon cards in tabular form upon which are placed the center point and dimensional orientation of units of a system in X, Y and Z distance terms;

FIG. 7 is the algorithmic form of such data as determined by the machine according to an independent computation to convert from the data of FIG. 6;

Figure 15:
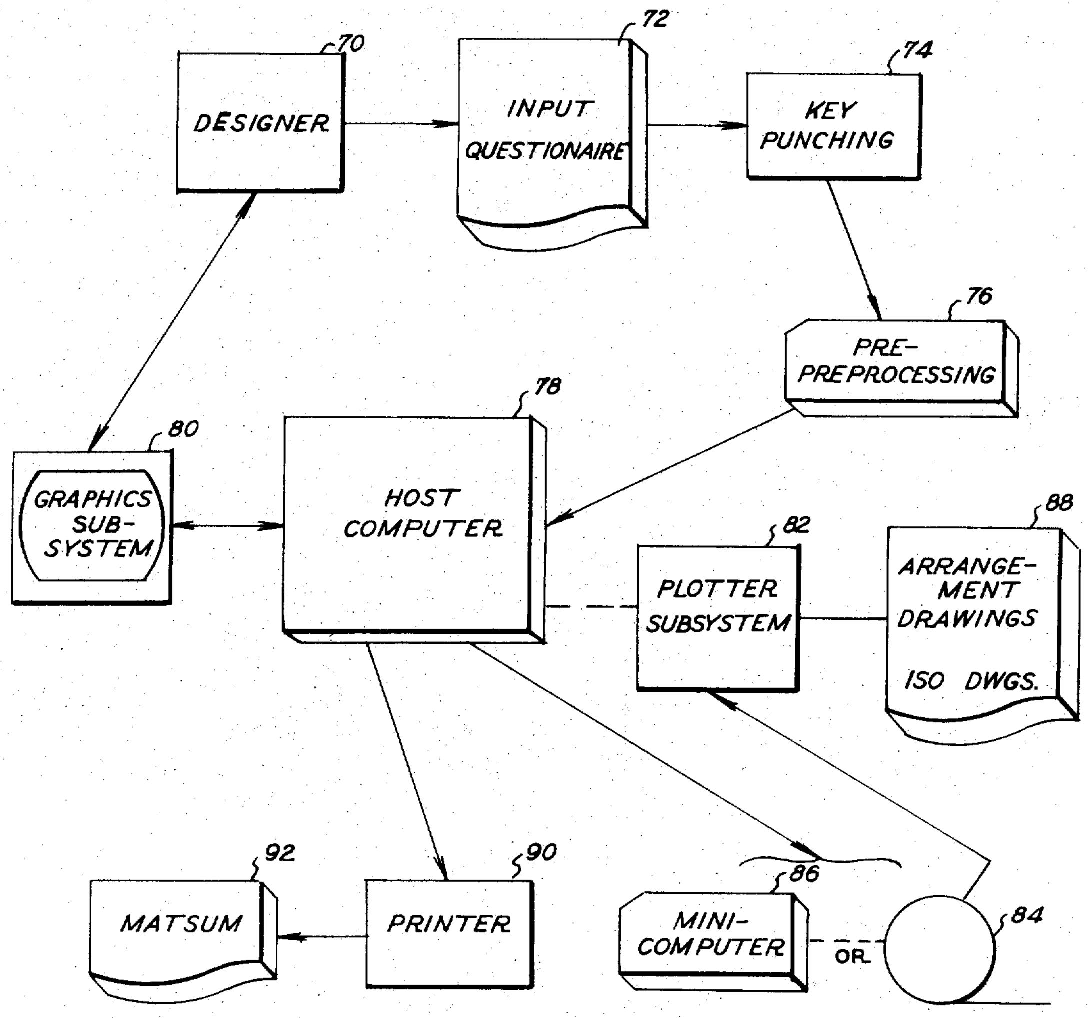
Figure 18:
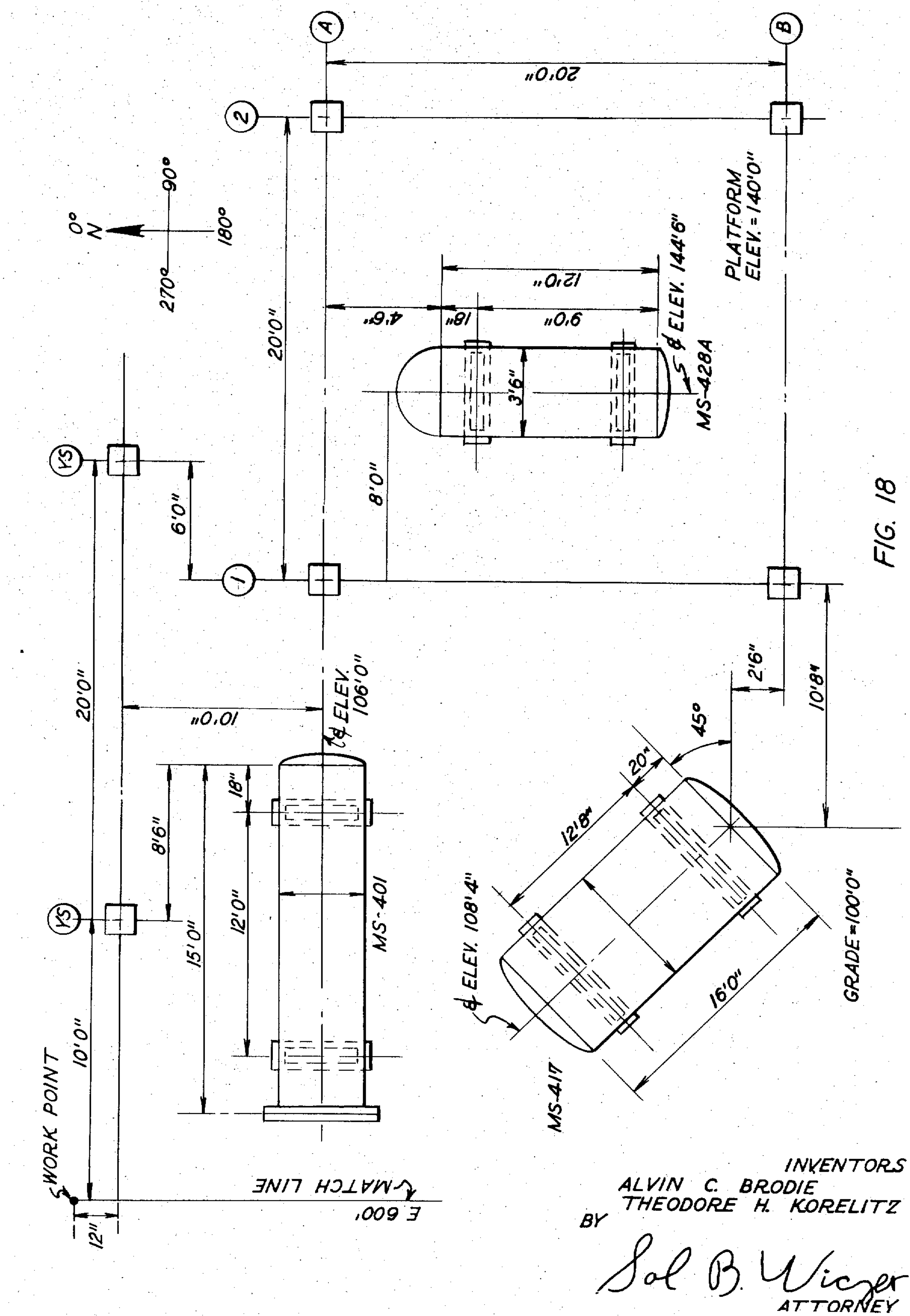
Figure 19:
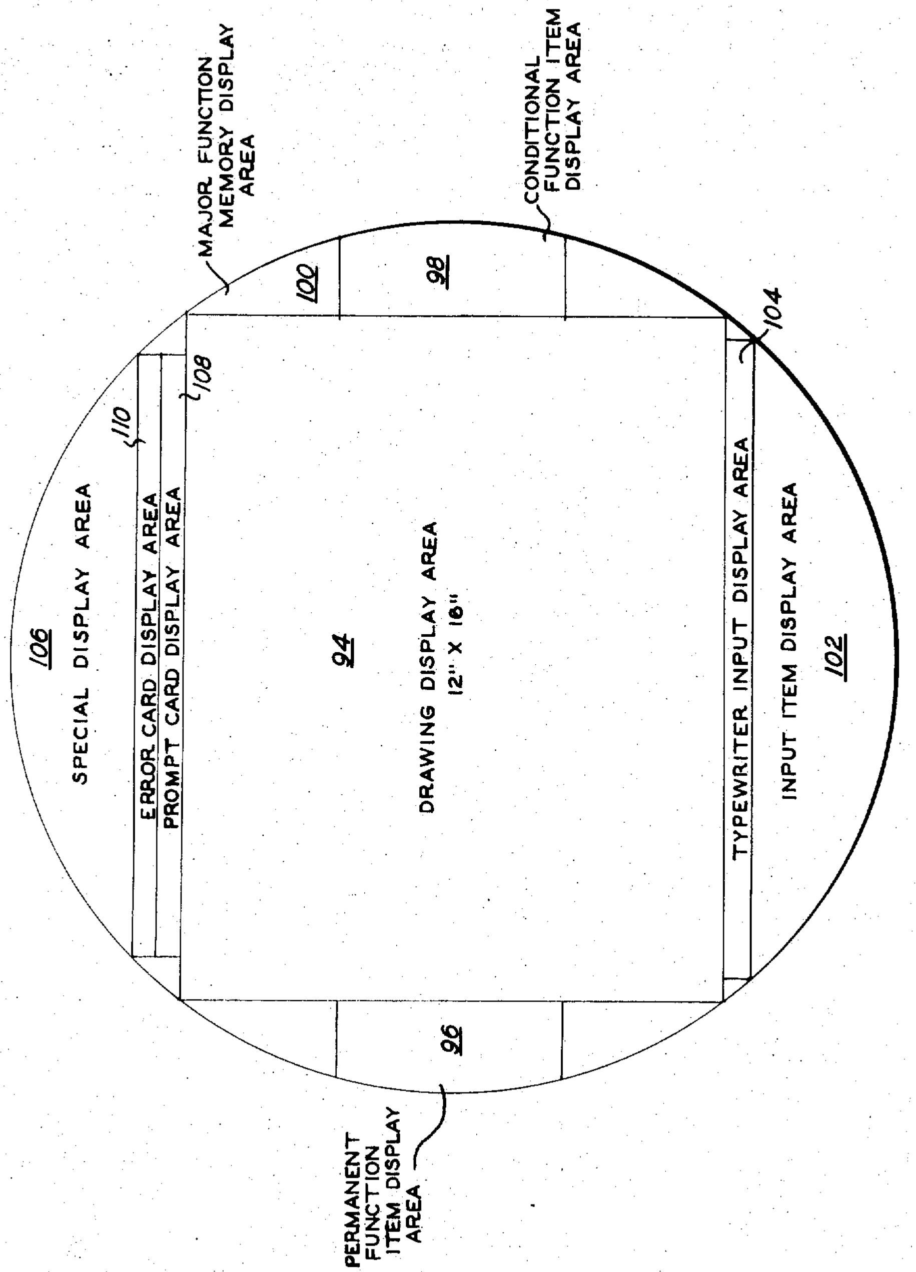
Figure 21A:
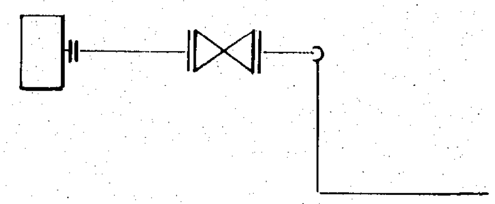
Figure 21F:
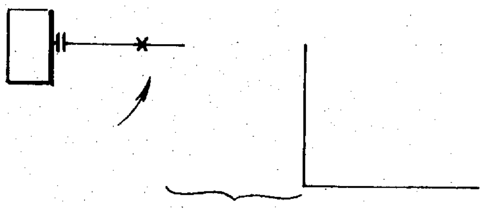
Figure 21B:
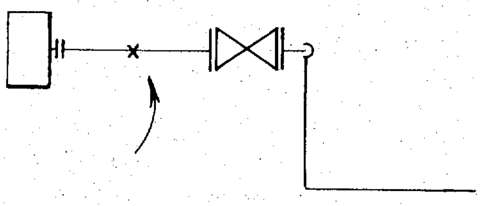
Figure 21G:
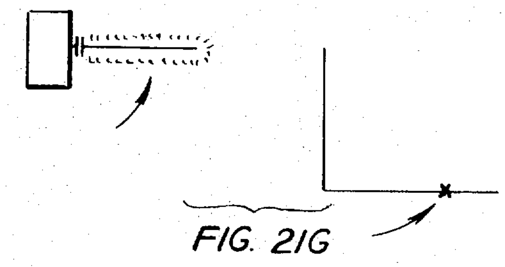
Figure 21C:
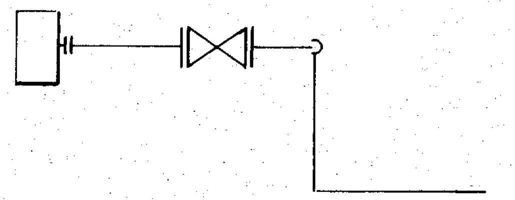
Figure 21H:
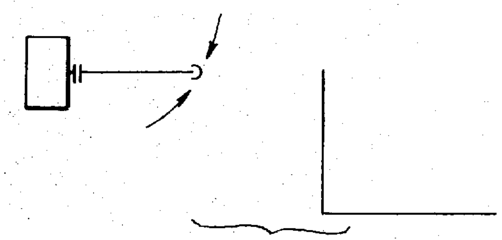
Figure 21D:
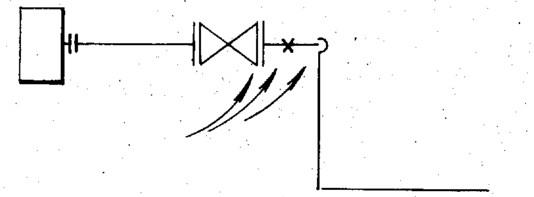
Figure 21I:
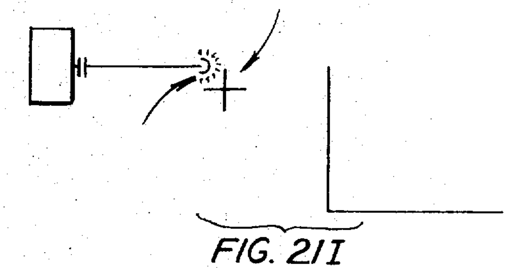
Figure 21E:
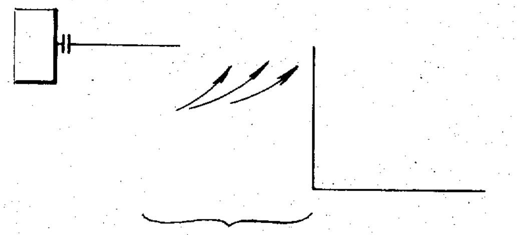
Figure 21J:
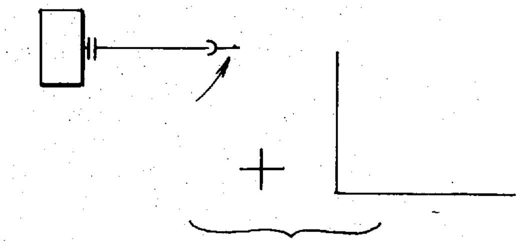
Figure 21K:
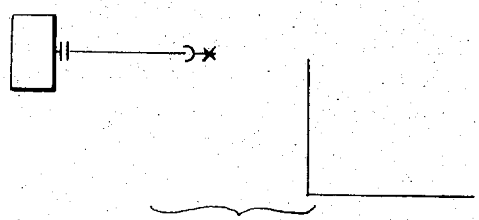
Figure 21O:
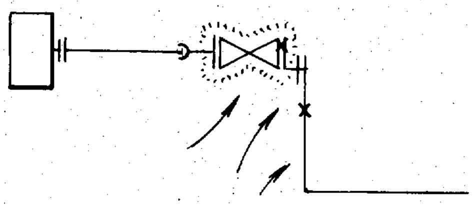
Figure 21L:
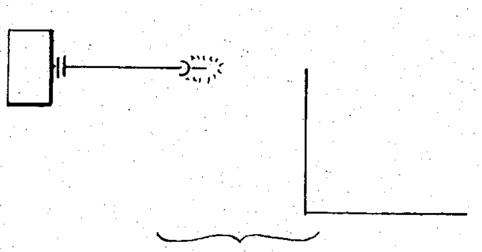
Figure 21P:
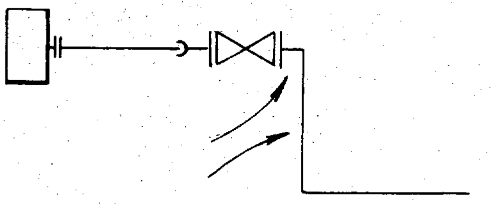
Figure 21M:
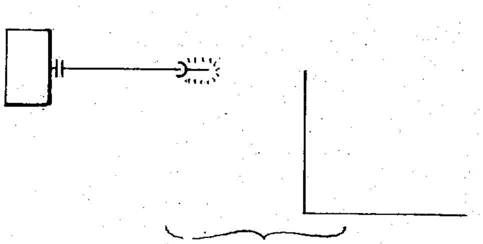
Figure 21Q:
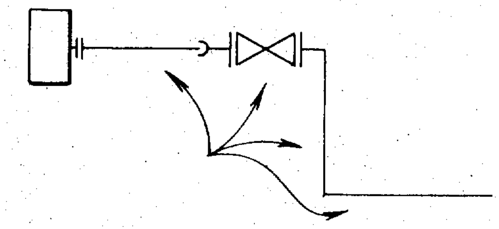
Figure 21N:
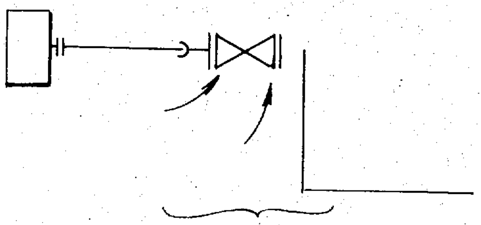
Figure 22:
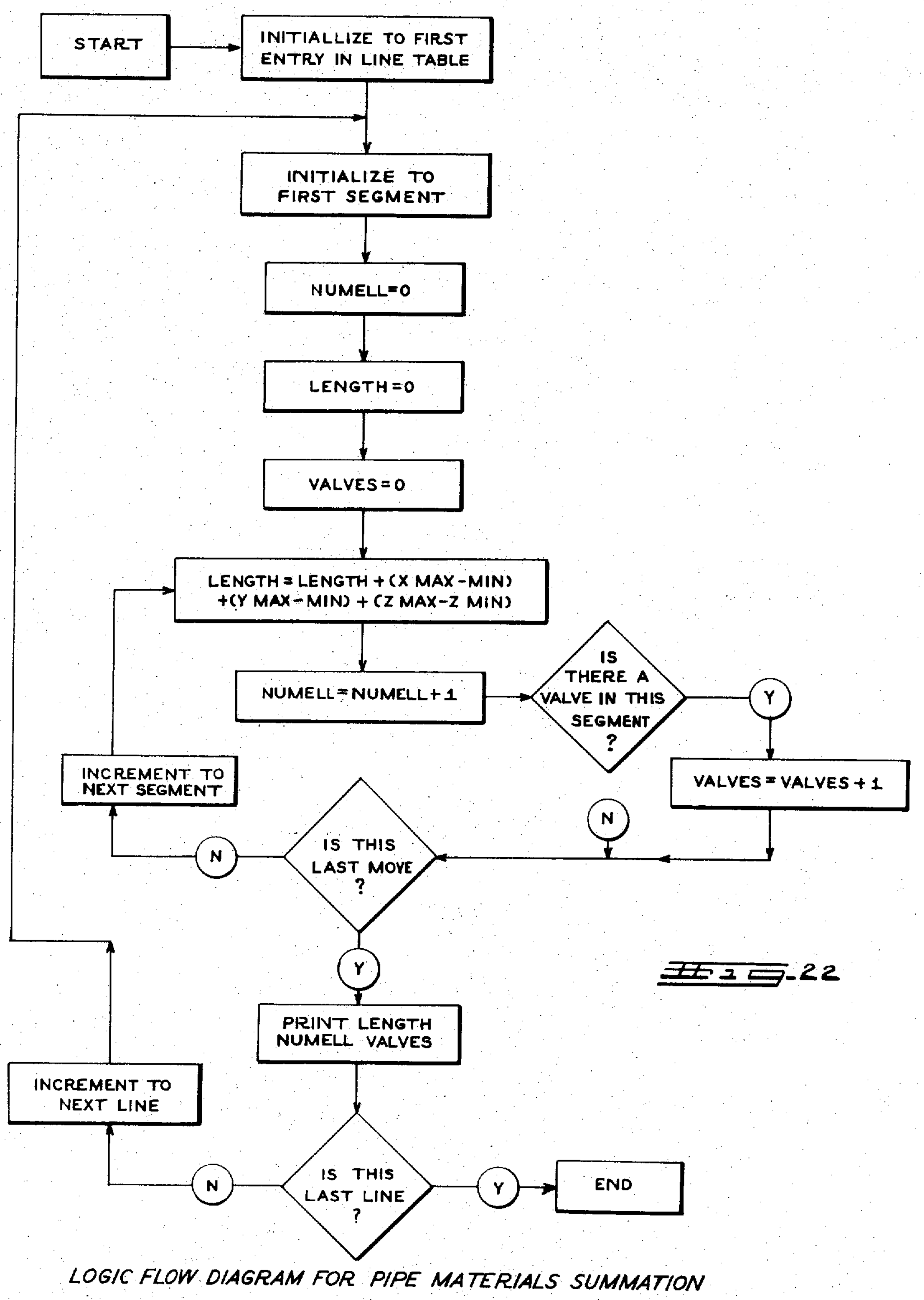

FIGS. 12, 13 and 14 list the data in tabular form as referred to in Example I;

FIG. 15 diagrammatically illustrates units integrated into the improved process and apparatus according to the present invention;

FIG. 16 illustrates a new form listing equipment particularly with respect to their orientation in the plot plan as listed by the draftsman;

FIGS. 17A, 17B, 17C and 17D illustrates the stepwise procedure for assembling the data of FIG. 16;

FIG. 18 is a typical example of equipment read out in a plot plan for summarizing the data thereof in a table according to FIG. 16;

FIG. 19 shows details of a graphics sub-system comprising a cathode ray tube including identified display areas;

FIG. 20 illustrates an equipment data sheet and;

FIGS. 21*a* – 21*q* illustrate a programming sequence graphically to modify one of a series of line diagrams reproduced in area 94 of FIG. 19, and illustrating the routine applied to display each change as they occur upon the cathode light tube in the said drawing display area as a series of graphical changes, and;

FIG. 22 illustrates a logic flow diagram useful for summation of pipe materials.

Figure 3:
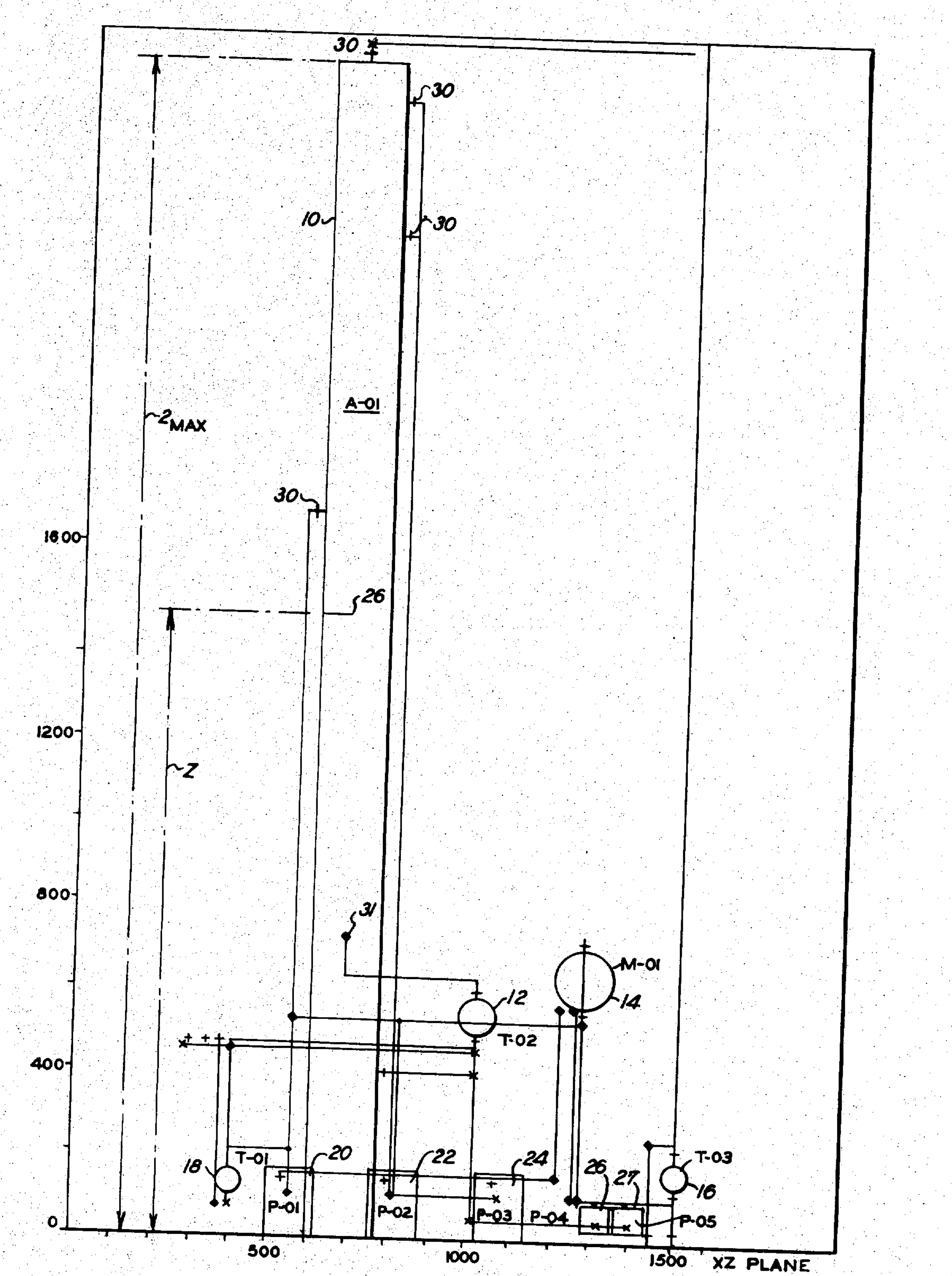
FIG. 3 is the front elevational view in the X-Z plane correspoding to the piping design of FIG. 2.

Referring to FIG. 3, a section of a solvent-extraction system is shown in a computer formed drawing, consisting of a front elevational view in the X-Z plane. The system shown comprises a large distillation column 10, a first heat exchanger 12, a storage tank 14, additional exchangers 16 and 18, and several pumps 20, 22, 24, 26 and 27. The designer-draftsman would normally have identified the tower 10 as A-01, the heat exchanger 12 as T-02, the tank 14 as M-01, the exchanger 16 as T-03, and the exchanger 18 as T-01, and the pumps 20, 22, 24, 26 and 27 as P-01, P-02, P-03, P-04 and P-05, respectively. The exact mode of operation of such chemical extraction system, while it would need to be known to the draftsman for purposes of piping it, that is, interconnecting the units for proper fluid flow from unit to unit to perform the process intended, is, in the particular process flow illustrated, not essential to the understanding of the present invention.

Figure 2:
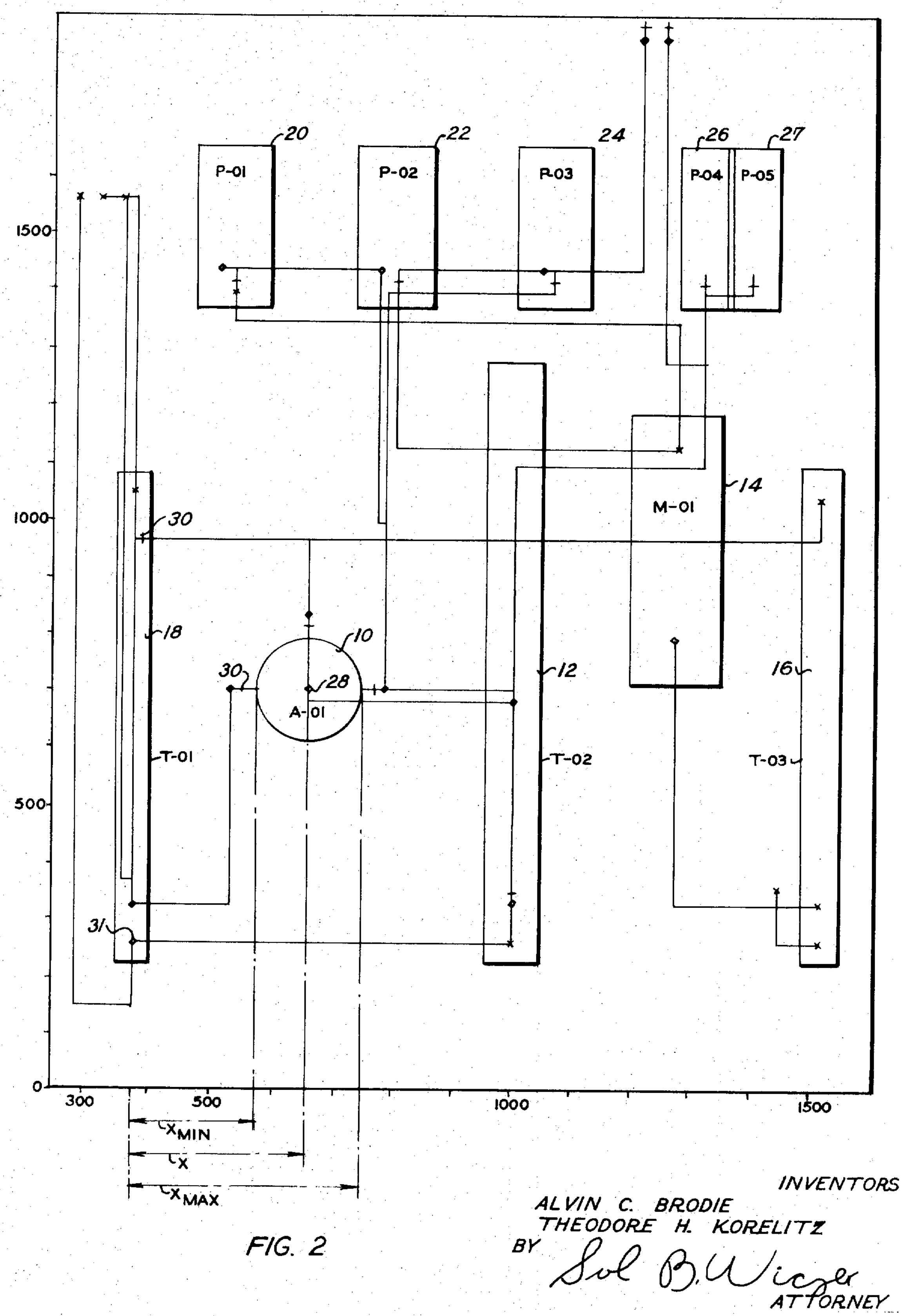
FIG. 2 is a design drawing in plan view illustrating an ultimate plotter output in the X-Y plane from the line series data produced by a computer from the initial plot plan of FIG. 5 according to the invention.
Figure 4:
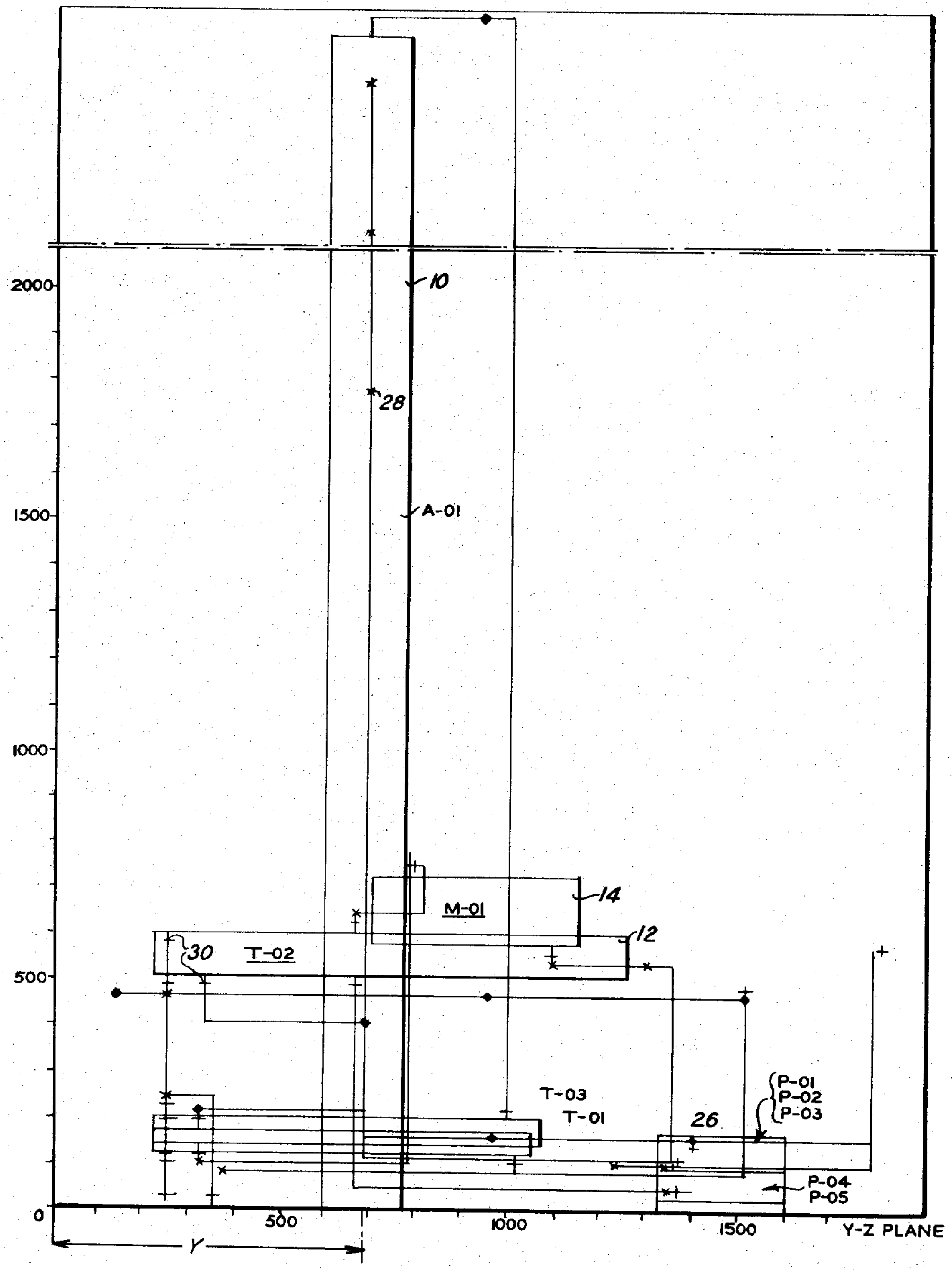
FIG. 4 is the side elevation view in the Y-Z plane corresponding to the piping design of FIG. 2.

It will be noted that FIG. 2 is a plan view; FIG. 3 is a front elevational view; FIG. 4 is a side elevational view; and FIG. 5 is an isometric view; of the same apparatus elements placed in the relative positions in which they will be fixed into the system, all of these drawings being formable by the computer in combination with a mechanical drafting machine such as an X-Y plotter, according to the invention of our parent applications.

Figure 5:
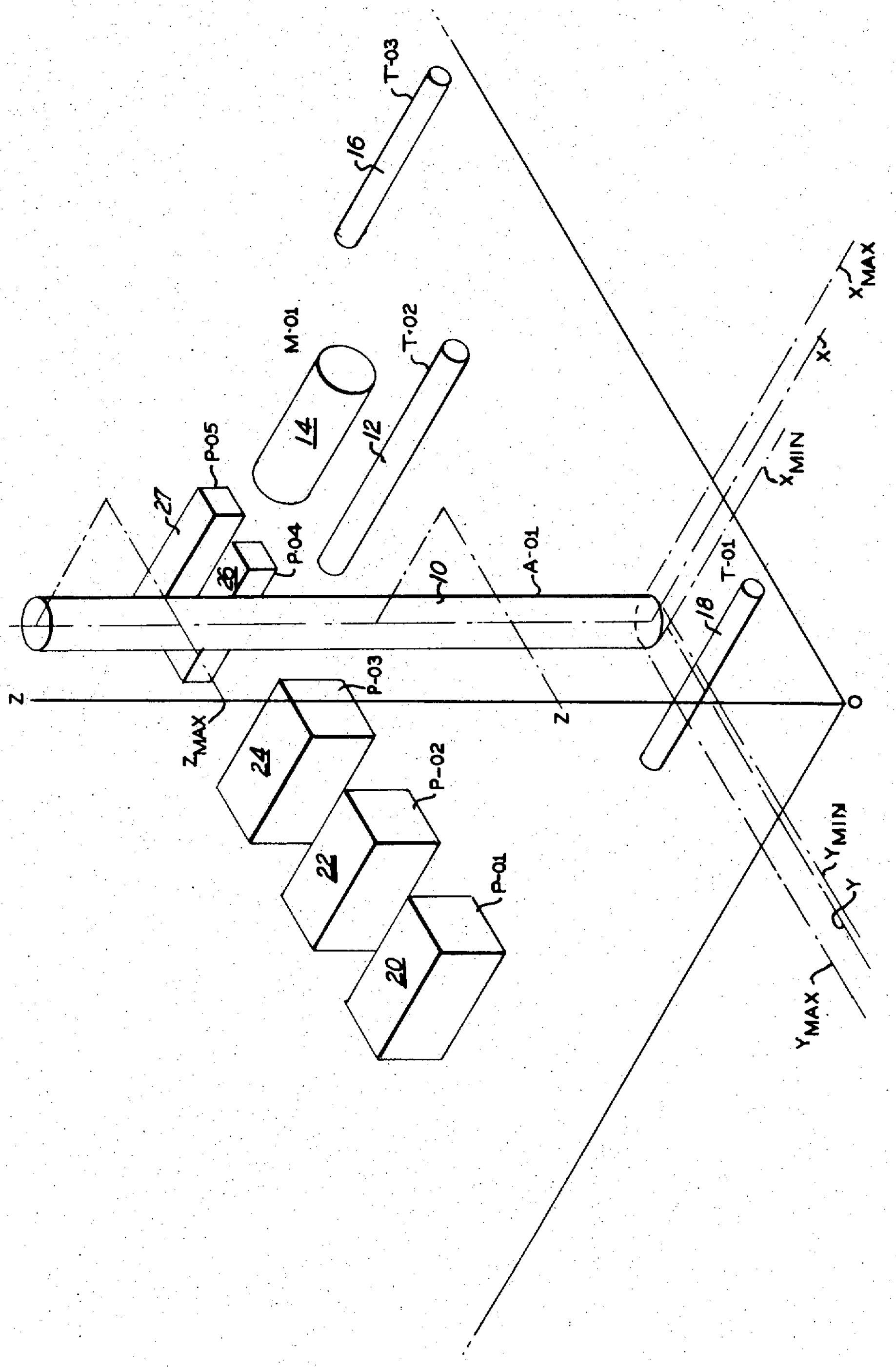

As a first step of these parent applications, illustrated in FIG. 5, the several elements are oriented into a plot plan on crosslined paper graphically, accurately positioning them with respect to an origin 0, and in proper scale, to indicate size, spacing and locations of each unit with respect to others of such system. FIG. 3, an elevation, would show the system layout as the units finally appear interconnected on the X-Z plane; FIG. 2 is a plan view, shows a similar drawing of these units as they finally appear in the X-Y plane; and FIG. 4, a side elevational view, shows the Y-Z plane appearance of the several pipes or finally interconnected units as drawn by an X-Y plotter. Purely isometric drawings as in FIG. 5 can also be prepared by a computer drafting device, such equipment obtained from equipment catalogues; or original equipment design drawings are located and distributed on a rough initial drawing, as herein termed a "plot plan." That plot plan locates each unit of equipment three-dimensionally with respect to the others as they are intended to be located in the system, and includes center point as well as outline dimensions of each unit as located in the system.

In forming the plot plan according to our parent applications, detailed sketches or drawings of each piece of equipment are used which indicate normal orientation of their axes and where the piping connections, nozzles, attach. Each piece of equipment is exactly arranged and oriented on the plot plan with respect to its origin point measuring exact distances to selected scale measured from that origin to the center point of the equipment. The outline dimensions of the emplaced equipment is measured in terms of maximum and minimum dimensions in X, Y and Z directions, thereby establishing the outline dimensions of the equipment in terms of X, Y and Z coordinates.

For purposes of securing approximate measurements of the spacing dimensions and location of the several units of the system, the several units are first located or oriented with respect to each other in a plot plan prepared by a person familiar with the equipment requirements of the unit.

FIG. 5, an isometric view, may be used to illustrate how the spacing and distances for each unit are measured for purposes of determining X, Y and Z location points needed as orienting data for supply to the computer. For instance, FIG. 5 illustrates X, Y and Z emanating from an origin 0. With such orienting plan, FIG. 5, it is possible to measure first a center point of an apparatus unit or element of the system; for instance, the distillation tower 10 (A-01) whose center point is indicated at 28. That center point lies along the X axis, a distance X from the origin, a distance Y in the Y direction from the origin, and a distance Z in the Z direction from the origin. This point measured in each direction from the origin gives the numerical X, Y and Z distance coordinates, locating the center point of the distillation tower 10 with respect to the origin. Similar measurements suffice to locate the center points of each of the other units in the system, and a layout chart of such points is shown in FIG. 6 which can be a group of input cards for each point or a composite chart for supply to a computer.

It will be apparent according to the improvements of the present application that the draftsman will, as usual, apply the same exactitude of locations of nozzles and general orientation as well as possible. However, since corrections are now easily made at an intermediate stage this affords opportunity to make revisions and improvements in the design at a later stage as may be needed or desired, as well as then to further correct any inaccuracies that may have been inadvertently introduced.

The draftsman, in beginning a layout of such system as described in our parent applications, would not only measure the center points and list the data corresponding to the X, Y and Z coordinates thereof for each of the units to be located in the system, but would also obtain dimensions of the equipment from available drawings prepared by the engineers, and suitably locate such in outline scale dimensions on the drawing. For instance, the tower 10 (A-01) is located a distance X from the center point and has a certain diameter in the X direction from the origin. As thus measured, the actual size (diameter) as well as location of each of the sides or perimeter of each unit is fixed in the X direction with respect from the origin as well as to other units of the system. In the same manner, measuring in the Y direction, a distance Y would measure the same center point and diameter of the distillation tower 10, and in the Z direction a distance Z would measure the distance above ground level of the bottom of the tower or its lowermost point in the system.

Referring then to FIG. 6, according to our parent applications, a complete tabular list of the center point and outline dimensions which can be formed is shown which also determines the spacing of each of the units. Such data is obtained from the plot plan drawing. FIG. 6 lists, for example, actual given dimensions with respect to the x, Y and Z coordinate center points of each unit. For instance, the tower 10 unit (A-01) is a typical draftsman's designation of a distillation tower 01 and the Z shown following A-01 in FIG. 6 indicates that the unit has its long axis parallel to the Z axis, thereby to approximately orient and define its vertical position. A typical preliminary plan for A01Z as shown in FIG. 6 would then designate its center point coordinates, the X distance (672), the Y distance (688) and the Z distance (1456) of the center point from the origin. Similarly, the dimensions, for instance, the diameter of the tower 10 (A01Z) in the X direction would be listed as 172. The tower being vertical and cylindrical, it would have the same dimension 172 in the Y direction, and it has a height of 2912, the Z direction.

For illustrative purposes of that earlier practice, typical orienting data for units to which the tower A-01Z will be interconnected by piping is given for the heat exchanger T-01 and T-02. Since their long axes are parallel to the Y axis, it is more fully designated as T-01Y, T-02Y. Similarly, X, Y and Z centerpoint dimensions are listed in FIG. 6 as 384 - 640 - 144 for T-01Y, and 1008 - 744 - 554 for T-02Y. Again, the dimensions are given for these heat exchangers in the three dimensions, X, Y and Z as 48 - 832 - 48 for the cylindrical heat exchanger T-01Y which will be understood thereby to be 832 inches in length (or at a scale of 4 units per inch, 17 feet, 4 inches long) in the Y direction; and 48 inches in the same scale reduction becomes 12 inches in diameter; and similarly for T-02Y the dimensions are 88 - 1040 - 88, of which 88 units (or 1 foot 10 inches) is the diameter and 1,040 units (21 feet 8 inches) is the length of the Y direction.

For purposes of manipulating this data within the computer, the center point locations and dimensions are listed in FIG. 6. They are dimensions of each unit to determine the relative spacing of the sides, top and bottom of the complete unit as it is placed in the memory of the computer. That data, as given in FIG. 6, however, is transposed by the computer to a number series, shown in FIG. 7, which are detailed algorithms, a data form usable by the computer. The entire tabular data compilation of FIG. 7 is an orientation of the several units of the system in terms of combination algorithms significant of the system. It is a machine-compiled list of data points from which the computing machine proceeds to make further linear computations, as will appear.

As shown in FIG. 7, the tower 10 heretofore indicated with the letter A in draftsman's language indicative of a tower, is given a numerical designation 41, which in the computer language would then be identifiable to the computer as a tower. The number of the tower, identifying this particular tower which may be 01 is continued, and that number is retained by the computer. The axis orientation Z of the tower is also converted by the computer to a number, i.e., the number 3, indicative to the computer of a Z axis. Similarly, the axis letter Y is converted to a number 2 and an axis orientation X may be numbered 1. Consequently, the tower 10 in draftsman's code identification is so designated in FIG. 6 as A-01Z, and becomes 41013, the numerical designation of said tower as transposed by the computer. Similarly, the heat exchangers 16 and 18 which would be designated by the piping draftsman in his code as T-01Y and T-02Y, are re-identified by the computer as 63012 and 63022, from which again it will be understood the first digit 63 identifies a heat exchanger, the 01 and 02 respectively identify the particular units, and the 2 identifies the layout as parallel to the Y axis.

The center point dimension X for each unit is replaced in the computations of the computer by perimeter dimensions measured in the X direction from the origin as X-min. and X-max., respectively designating the near and far points of the tower mesured from the origin in the X direction. In the same way, the Y center point data of FIG. 6 is re-stated by the computer in FIG. 7 as Y-min. and Y-max. In the algorithmic form, the numbers orienting and measuring the near and far distances of each point from the origin in the Y direction. The same measurement is made as Z-min. and Z-max. in the Z direction. In this manner all of the boundary dimensions of each of the units comprising the system are converted into a table of algorithms as shown in FIG. 7. Hence, this table comprises the three-dimensional orienting data which establish the outline or boundary dimension form of each unit, its identification, as well as its size and spacing in the system, all coordinated graphically in three-dimensions with respect to the origin.

Thereafter the algorithm table, FIG. 7, formed in the computer per se, can be transposed to visible typewritten form or placed on magnetic or punched tape form, as can be conveniently used with the particular computer to be used, and the out-put data is stored for future use, but it is most usually stored in the memory of the computer. Consequently, the computer then has in its memory the complete X, Y and Z component measurement points comprising the total outline perimeters, sides, tops and bottoms, locations of each unit as they are to be emplaced; that is, as they are positioned to be interconnected, integrated, into the fluid transfer or other linearly interconnected system.

As the next step, for purposes of interconnecting the several units according to our parent applications, the exact points where lines (pipes) are to connect with each unit are similarly oriented in typical three-dimensional orienting form, first locating the exact site or sites upon each unit which is to be the inlet or outlet termnal site of a connecting pipe or line to or from the unit. The connecting site of a line or pipe with a unit is commonly referred to as a "nozzle."For instance, referring to FIG. 3, it will be noted that the tower 10 has little crosslines (T) 30 which are draftsman's symbols for such nozzles or points where inlet or outlet pipes connect to the unit as seen from the side or as small circles (o) 31 when viewed from the front. These very points of connection 30 are read into the memory of the computer as three-dimensionally oriented points with respect to the graphic origin, in the same manner as described above for the units themselves, and are converted to the same algorithmic form as described for other machine-produced locating data of FIG. 7. For instance, each point of connection must be identified by a number significant of the point as well as its location with respect to the unit to be interconnected therewith. Moreover, that identifying number for a connection can be used in duplicated form upon the remote destination nozzle which is to be interconnected by the same pipe or line, or the same result can be obtained by a specific sequence of numbers which can be so idenfified by the computer. Thus, the identifying indicia may also supply a number significant to the computer to distinguish between a starting nozzle and a destination nozzle so that the machine when asked to compute the passageway between one nozzle and another will know where the path to be computed begins and where it ends.

The procedure of our parent applications is further illustrated isometrically in FIG. 5 wherein the several units are shown suitably positioned one with respect to the next. The plot plan data is measured in suitable scale size from the origin to the several center lines of each unit together with the dimensions of each unit, and these are converted by the forementioned preprocessor into the form shown in FIG. 6. The computer converts the same to algorithmic form as formed, and identifying numbers used and set forth by the computer in FIG. 7. This algorithmic data, it will be noted, is numerical identification and the actual three dimensional locating data of critical peripheral or perimetrical dimensional boundaries in terms of maximum and minimum boundary limits of each unit with respect to the origin.

The computer, then, as a next step, has programmed into its memory certain line limits. For instance, this may be a chemical plant for which it is desired to have a free area through which no pipes pass so that people can walk or automobiles can drive through the area. A limit for this is read into the computer; for instance, that all pipe lines shall pass at least ten feet above ground level. All Z dimensions of computed paths are thus made to exceed 10 as a lower height limit in certain X and Y areas, which is read into the computer in this manner as a limit.

The computer may further have read into its various other desired memory limits which will limit its paths for any of many purposes, as listed above. It may have, for instance, as a most usual line limit that each line shall pass only in X, Y or Z directions (never diagonally) to establish a symmetry or orderliness in the piping. The computer for this purpose is asked first to perform its connections of listed pairs of nozzles first in the X direction; then in the Y direction; and finally in the Z direction; always moving from the initial point closer to the final point, and without more than two changes of direction. This is only an opening gambit, and interferring limits will often require other sequences of directions, as well as more than two changes of direction.

Figure 8:
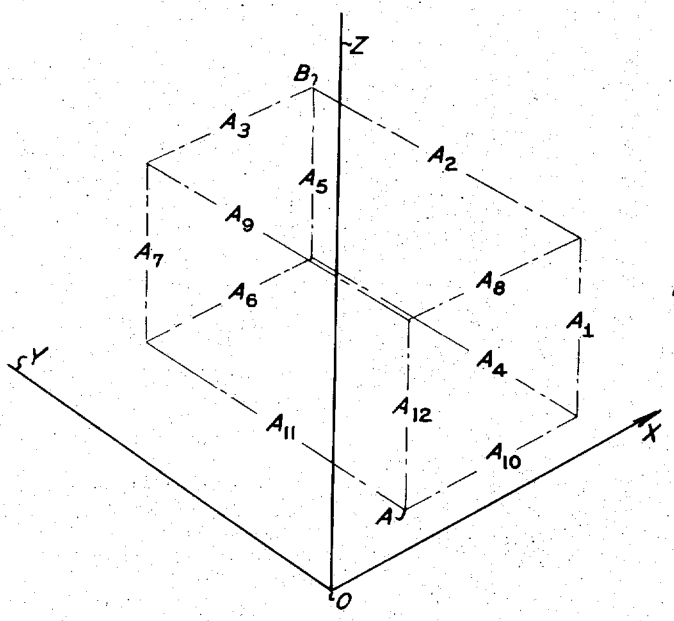
FIG. 8 is a diagram illustrating the numerous line choices of a computer to select any of several passageways to interconnect specific points.

The manner in which the computer actually fixes the several lines or passageways is illustrated in simple diagram in FIG. 8. That figure illustrates by numerous passageways the computation of passageways, selecting from several alternate paths of a passageway from the point A to the point B. The dotted cubical (or rectangular prism) construction illustrates six different ways for this movement from A to B. The computer will perform one or all six path computations, moving as indicated first in the X direction, then in the Y direction and finally in the Z direction to effect the connection from A to B, moving in that sequence, starting with the first and switching to the next when some limit programmed into the machine is reached, changing as often as necessary, until a free path within the imposed limits is found. The limit may, for instance, be some other blocking pipe or unit. Hence, if asked first to proceed in an X direction, the computer may find a blocking limit obstructing in the X direction movement, whereby it will then proceed in a Y direction as an alternate or possibly in a Z direction as an alternate, depending upon the presence or absence of an obstruction. Various additional limits as described above and usually including that the path shall be the shortest one between the points A and B may be imposed. For illustrative purposes herein the arbitrary limit that the path shall be that of a pipe which may not pass within three inches of any other object contained in the defined space is imposed. If none of the six primary points is open, the path can move in a negative X, Y or Z direction until some obstruction or limit is cleared, before then passing in the preferred X, Y or Z positive directions.

As shown in a diagram of FIG. 8, the starting point A, the movement through the six primary paths may be

| | | | |
|---|---|---|---|
| A | $A_{10}$ | $A_4$ | $A_5$ |
| A | $A_{10}$ | $A_1$ | $A_2$ |
| A | $A_{11}$ | $A_6$ | $A_5$ |
| A | $A_{11}$ | $A_7$ | $A_3$ |
| A | $A_{12}$ | $A_8$ | $A_2$ |
| A | $A_{12}$ | $A_9$ | $A_3$ |

Obviously the number of possible movements to define a pathway available by combining both positive and negative would be greatly increased. These paths each involved at least three changes in direction, each segment of the path being parallel to an X, Y or Z direction.

In proceeding for testing the various paths of the selected pipe, the computer scans each segment in sequence for interference with any existing equipment within three inches of the pipe segment whose path is to be determined, or other segments already determined and set forth in a table stored in the memory of the machine as from FIGS. 6 or 7. The first segment of the path is tested first. If there is no such interference with the first segment, then the second segment of that path is tested. If there is interference in any of the three segments of any path, that path is bypassed and another of the five remaining paths as listed above is then tried. As soon as all three segments of any path are found to be satisfactory, an exit is made from the testing routine; the satisfactory path is then stored in tables similar to that of FIG. 7, indicating the identification of a satisfactory path numerically identified in terms usable by the computer. The program control then continues to the beginning of the routine for the next line to be determined for interconnecting the next pair of points.

Figure 11:
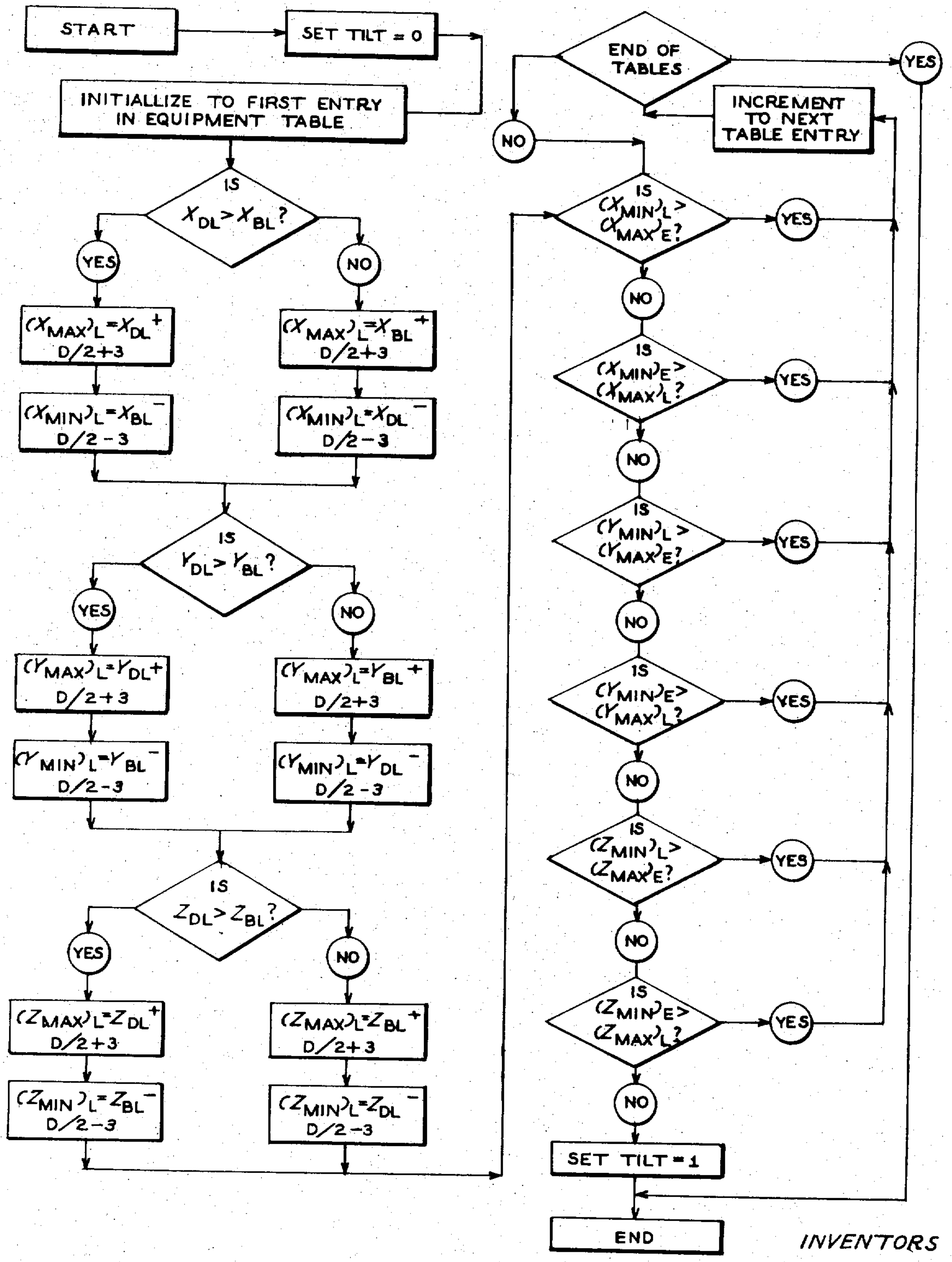
FIG. 11 is a detail of FIG. 10 procedure illustrating computer routine for checking interferences.

The method used by the system to check for each interference with a pipe segment having the abovestated three inch clearance limit is further described by the block diagram of FIG. 11. As shown in FIG. 11, a diamond-shaped block is used to indicate a test with either a "yes" or "no" response; a rectangular block is used to calculate all internal transmission steps; and a rectangular shaped block to indicate the start and finish of the particular test routine. The arrows and lines connecting the block indicate the logic and steps used in execution of the program.

It is assumed that the several pieces of equipment of the system to be interconnected are present in the form represented by FIG. 6 and stored in the computer memory in the form illustrated by FIG. 7. The area occupied by each piece of equipment is defined in these tables and in the computer memory by the dimensional coordinates $Xmin_e$, $Ymin_e$, $Zmin_e$, $X\ max_e$, $Y\ max_e$, and $Zmax_e$, wherein the "*e*" refers to equiipment. The start of each line segment, the nozzle location, is defined by the points $X_{BL}$, $Y_{BL}$ and $Z_{BL}$ where the subscript "B" signifies the beginning or starting point, and "L" indicates that the point references a line segment. The end of the line segment is defined by the point $X_{DL}$, $Y_{DL}$ and $Z_{DL}$, the subscript "D" being significant of the destination point of the segment. The symbol "D" refers to the pipe diameter.

A memory location, referred to as "TILT" is established as an indicator which internally informs the machine of the presence or absence of interference as defined by the programmed limit between the line segment and the equipment. When this memory location is found to contain a zero, it is indicative of the fact that the line segment does not pass within, exceed or violate the specified three inch limit of any piece of equipment; that is, the line is acceptable according to this imposed limit. When it contains a one, it indicates that the specified limit has been violated in at least one instance.

In following the program as outlined by FIG. 11, the procedure is first to set TILT to equal zero. The three-dimensional area comprising the pipe dimensions and clearance is established to represent the line segment. Two of the dimensions of this area are equivalent to the pipe diameter plus the selected three inch specified clearance and the third dimension is equivalent to the line segment length plus the pipe diameter plus the clearance. This area is defined on the block diagram by the dimensional coordinates $Xmin_L$, $Ymin_L$, $Zmin_L$, $Xmax_L$, $Ymax_L$, and $Zmax_L$, the subscript "L" referring to line segment.

Figure 10:
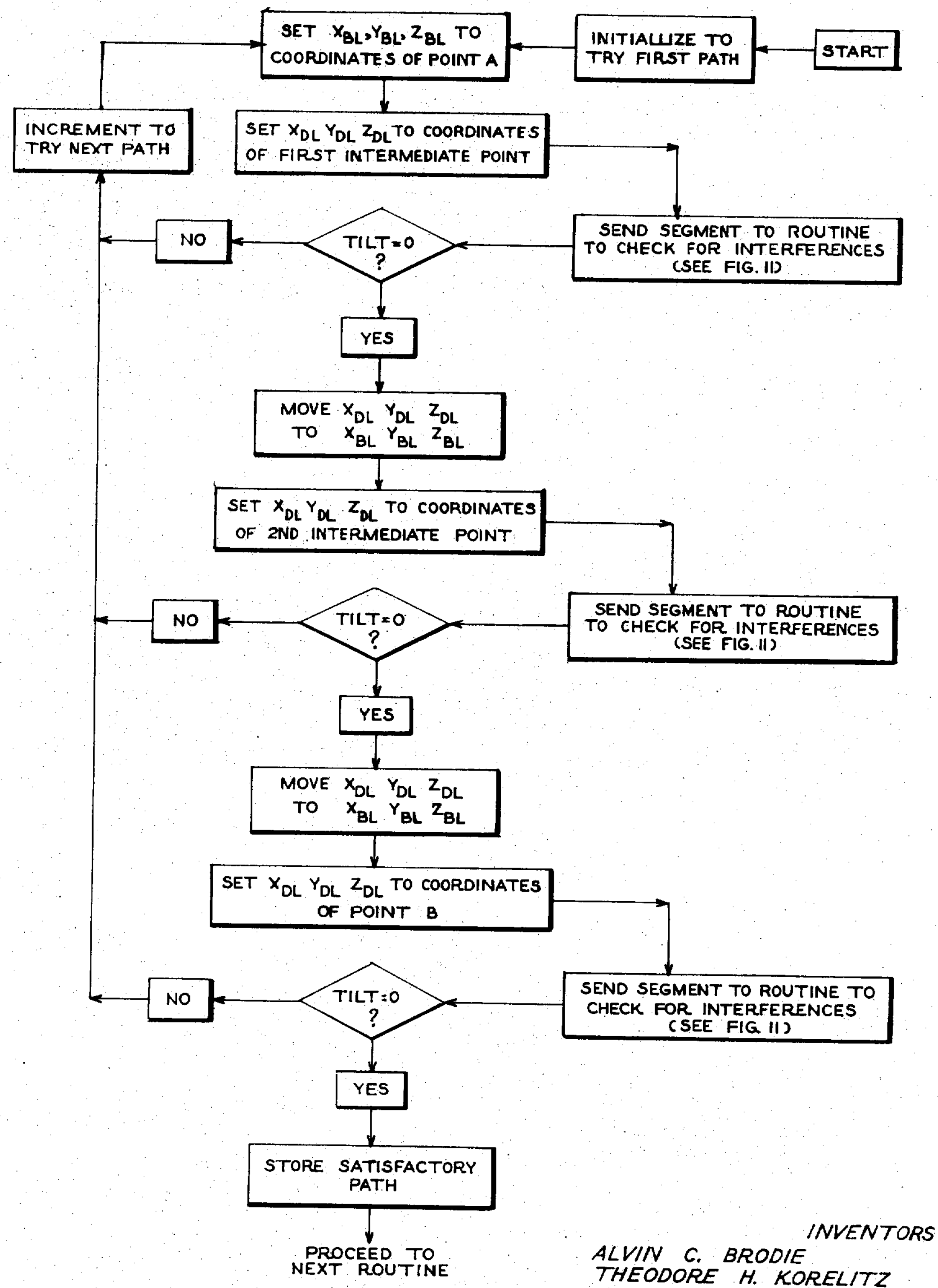
FIG. 10 is a diagram illustrating the typical operation of a computer to draw a line with imposed limits.

Proceeding further to execute the program, the dimensional coordinates of the line segment area are then calculated from the starting point ($X_{BL}$, $Y_{BL}$, $Z_{BL}$), the destination point ($X_{DL}$, $Y_{DL}$, $Z_{DL}$), the pipe diameter (D), and the specified clearance limit (in this case 3 inches). The program then proceeds to perform six tests of the line segment with respect to each pipe of equipment, following the detailed steps as set forth in FIG. 11; these tests determining whether the three-dimensional area established for the line segment touches the area occupied by the piece of equipment or any of its six sides. If a space is not found between the two areas on all six sides, a one is transferred to TILT, replacing the zero originally located there, and control is transferred back to the portion of the program which called for the interference check (FIG. 10). If all the tests are satisfied, another piece of equipment is tested; and so forth, until either an interference has been described or all the equipment has been tested. If all the equipment is tested and no interference is found, control is transferred back to the calling program with a value of zero remaining in TILT; thus signifying that the line segment clears each piece of equipment by the specified limit.

Assuming that the computer has been programmed with various limits including that the line A–B of FIG. 8 may not pass closer than three inches to any other line (as described in FIG. 11), the routine to determine a proper path for this individual line is explained further in the diagram of FIG. 10. This diagram merely sets forth a typical routine which an experienced computer programmer will recognize according to the following description of how the point A and B of the diagram illustrated in FIG. 8 are interconnected by a line of three segments by operation of the computer.

As shown in FIG. 10, the coordinates $X_{BL}$, $Y_{BL}$ and $Z_{BL}$ locating the initial point A and then the terminal coordinates $X_{DL}$, $Y_{DL}$ and $Z_{DL}$ are set, defining between them the first line segment $A_{10}$. That segment $A_{10}$ then has a routine check made for interference by a scanning procedure with the steps outlined above and shown in FIG. 11.

The memory location referred to as TILT is set to be equal to zero if no interference is encountered for the particular segment, according to the imposed limits, and equal to one if interference is, in fact, found for the segment. The 1 and 0 conditions, the presence or absence of interference, are indicated by the blocks "no" and "yes" respectively in the FIG. 10. Thus, when an interference is found, the signal is returned for a reset of the line segment extending from the initial point A for testing in some other (Y or Z) direction; for instance, by next testing a line segment $A_{11}$. The beginning and terminal coordinates of the line segment $A_{11}$ are then set into the machine and the described test procedure is repeated to again determine interference for the new line segments.

On the other hand, if no interference is first found in the routine check of segment $A_{10}$, TILT being 0, then the procedure conditions for determining interference of a second line segment is begun. The beginning of the second segment $A_4$ is the same as the terminal coordinates of segment $A_{10}$; that is, the coordinates $X_{DL}$, $Y_{DL}$ and $Z_{DL}$ of $A_{10}$ are reset as the new initial coordinates $X_{BL}$, $Y_{BL}$ and $Z_{BL}$ of the segment $A_4$. Similarly, its terminal coordinates are $X_{DL}$, $Y_{DL}$ and $Z_{DL}$ and identify the second intermediate terminal point of the second segment $A_4$. The scanning procedure for segment $A_4$ routine is repeated as before. Again, assuming TILT equals one, that is, if the "no" block controls, and interference is indicated, the routine returns to the beginning of line segment $A_4$ (the end of segment $A_{10}$ ) to attempt another direction; for example, the direction of line segment $A_1$, and the intermediate procedure described above is repeated.

On the other hand, if TILT equals 0 is found as the result of that routine interference check for line segment $A_4$, that is, no interference was found for the $A_4$ segment, then the block "yes" will control and the next segment $A_5$ has its start and terminal coordinates set up for interference check. This is done as before. The terminal point $X_{DL}$, $Y_{DL}$ and $Z_{DL}$ of segment $A_4$ becomes the initial point $X_{BL}$, $Y_{BL}$ and $Z_{BL}$ to define the beginning of the segment $A_5$ and the point B coordinates $X_{DL}$, $Y_{DL}$ and $Z_{DL}$ become the coordinates identifying the terminal of line segment $A_5$. A final routine scanning check of that line segment $A_5$ is then made through the interference checking procedure and as before if TILT equals one and the block "no" controls, the computer is returned to attempt a different direction from the terminal end of segment $A_4$ as its initial position. That new direction may be changed to the segment $A_6$ rather than $A_5$, so that the terminal point thereof $X_{DL}$, $Y_{DL}$ and $Z_{DL}$ will then be the coordinates at the intersection of segments $A_{11}$ and $A_6$ and then proceed by way of segments $A_7$ and $A_3$, or it may at this point be better to return to the start of the series to try segment $A_{11}$ as the initial segment for combination with $A_7$ and $A_3$. Possibly it may be necessary to move in a negative direction but the procedure proposed by the computer to draw a line from the point A to B will be apparent.

EXAMPLE I

To further illustrate the program flow charts presented in FIG. 10 and 11, reference is made to the diagram shown in FIG. 8 of the steps needed to be preformed in passage from point A to point B. The actual data accumulated in the procedure is set forth in tables FIGS. 12, 13 and 14. For instance, the point A is a point on a piece of equipment designated in the equipment table as *p*-18-*x* and point B to be connected to point A is a point on a piece of equipment designated as *m*-26-*z*. Thus this example illustrates arbitrary data as obtained in passing from point A to point B of FIG. 8. As a first step following the procedure of FIG. 10, the coordinates of point A are transferred to the memory locations specified as $X_{BL}$, $Y_{BL}$ and $Z_{BL}$. The coordinates of the first intermediate point (see FIG. 13) are transferred to $X_{DL}$, $Y_{DL}$ and $Z_{DL}$. Therefore:

$$X_{BL} = 117.0 \qquad X_{DL} = 290.0$$
$$Y_{BL} = 240.0 \qquad Y_{DL} = 240.0$$
$$Z_{BL} = 42.0 \qquad Z_{DL} = 42.0$$

The segment defined by these two points in space is sent to the routine to check for interference. Upon returning, the variable TILT is tested for a value of zero. If TILT contains a zero, the values in $X_{DL}$, $Y_{DL}$ and $Z_{DL}$ are moved to $X_{BL}$, $Y_{BL}$ and $Z_{BL}$ and the coordinates of the second intermediate point (see FIG. 13) are moved into $X_{DL}$, $Y_{DL}$ and $Z_{DL}$. Therefore:

| | |
|---|---|
| $X_{BL} = 290.0$ | $X_{DL} = 290.0$ |
| $Y_{BL} = 240.0$ | $Y_{DL} = 352.0$ |
| $Z_{BL} = 42.0$ | $Z_{DL} = 42.0$ |

A check is again made for interference. If TILT = 0, $X_{DL}$, $Y_{DL}$ and $Z_{DL}$ are transferred to $X_{BL}$, $Y_{BL}$ and $Z_{BL}$. The coordinates to point B are then moved into $X_{DL}$, $Y_{DL}$ and $Z_{DL}$. Therefore:

| | |
|---|---|
| $X_{BL} = 290.0$ | $X_{DL} = 290.0$ |
| $Y_{BL} = 352.0$ | $Y_{DL} = 352.0$ |
| $Z_{BL} = 42.0$ | $Z_{DL} = 550.0$ |

A third check for interference is made and is TILT = 0, the coordinates of the good path are stored on the disc file. If, during any of the interference tests, an interference is discovered, TILT will have a value inequal to zero and control will be transferred back to the second step for the next path i.e., A-$A_{10}$-$A_1$-$A_2$-B. Each segment which is sent to the interference routine is scanned in accordance with the program steps shown in FIG. 11. Thus, considering the first segment of the first path tried, that is, the segment from point A to the first intermediate point of the first path, the coordinates of these points have been set up in $X_{BL}$, $Y_{BL}$, $Z_{BL}$, $X_{DL}$, $Y_{DL}$ and $Z_{DL}$ as described. At the start of the interference routine a value of zero is assigned to the location TILT and a pointer is set to the first entry in the equipment table (FIG. 12) which has been established previously as described by FIGS. 6 and 7. Next, the value of $X_{DL}$ (290.0) is compared to the value of $X_{BL}$ (117.0). It is found to be larger than $X_{BL}$; then $(X_{max})_L$ and $(X_{min})_L$ are calculated from the relationships:

$$(Xmax)_L = X_{DL} + D/2 + 3$$

$$(Xmin)_L - {}_{XBL} - {}_{D/}2 - 3$$

and since the diameter, D, as noted on FIG. 14 is 10″, the values of $(Xmax)_L$ and $(Xmin)_L$ are calculated as:

$$(Xmax)_L = 290.0 + 10/2 + 3 = 298.0$$

$$(Xmin)_L = 117.0 - 10/2 - 3 = 109.0$$

Next, $Y_{DL}$ is compared to $Y_{BL}$ and found to be not greater than $Y_{BL}$, so $(Ymax)_L$ and $(Ymin)_L$ are calculated as:

$$(Ymax)_L = Y_{BL} + D/2 + 3 = 240.0 + 10/2 + 3 + 248.0$$

$$(Y/min)_L = Y_{DL} - D/2 - 3 = 240.0 - 10/2 - 3 = 232.0$$

Similarly, $(Zmax)_L$ and $(Zmin)_L$ are calculated as:

$$(Zmax)_L \; 32 \; Z_{BL} + D/2 + 3 = 42.0 + 10/2 + 3 = 50.0$$

$$(Zmin)_L = Z_{BL} - {}_{D/}2 - 3 = 42.0 - 10/2 - 3 = 34.0$$

Consequently, this program has prepared six coordinates which define the limits of a block of space containing a piece of pipe running between point A and the first intermediate point of the first path. These coordinates together with all of the other coordinates of all segments of the six possible paths are shown in FIG. 14. The next portion of the interference routine illustrated in FIG. 11, performs the tests to determine if the special block thus created to represent the piece of pipe from point A to the first intermediate point passes through or touches any of the special blocks representing the individual pieces of equipment shown in FIG. 12. At the beginning of this portion, the program will be scanning the coordinates of the first piece of equipment, *p*-81-*x*. The coordinates in question are:

| | |
|---|---|
| $(Xmin)_L = 109.0$ | $(Xmin)_E = 130.0$ |
| $(Ymin)_L = 232.0$ | $(Ymin)_E = 228.0$ |
| $(Zmin)_L = 34.0$ | $(Zmin)_E = 27.0$ |
| $(Xmax)_L = 298.0$ | $(Xmax)_E = 165.0$ |
| $(Ymax)_L = 248.0$ | $(Ymax)_E = 252.0$ |
| $(Zmax)_L = 50.0$ | $(Zmax)_E = 57.0$ |

The six tests that are performed are specifically designed to test for the situation where one of the blocks of space is beyond the spacial limits of the other. When this situation is discovered on any of the six tests, it is indicative of the fact that there is no interference between the two blocks and no further testing of the particular two blocks is required. The pointer is incremented to the next piece of equipment and the tests repeated until either an interference is detected or all pieces of equipment have been scanned against the segment block without detecting an interference. An interference can be considered to exist when at least one of the two limits along each axis of one of the blocks falls within the limits of the corresponding axis of the other block; or, in terms of the tests performed, when none of the six coordinates of one of the blocks is outside the limits of the other block. The tests are performed as follows:

| | | | |
|---|---|---|---|
| (1.) | Is $(Xmin)_L$ | GREATER THAN | $(Xmax)_E$ |
| | 109.0 | 165.0 | No, then |
| (2.) | Is $(Xmin)_E$ | GREATER THAN | $(Xmax)_L$ |
| | 125.0 | 298.0 | No, then |
| (3.) | Is $(Ymin)_L$ | GREATER THAN | $(Ymax)_L$ |
| | 232.0 | 252.0 | No, then |
| (4.) | Is $(Ymin)_E$ | GREATER THAN | $(Ymax)_L$ |
| | 130.0 | 248.0 | No, then |
| (5.) | Is $(Zmin)_L$ | GREATER THAN | $(Zmax)_E$ |
| | 34.0 | 57.0 | No, then |
| (6.) | Is $(Zmin)_E$ | GREATER THAN | $(Zmax)_L$ |
| | 27.0 | 50.0 | No, then |

an interference is indicated and the variable TILT is assigned a value of 1. Control is returned to the program which sent the points to the interference routine. Note that the segment $A_{10}$, actually passes through the piece of equipment *p*-81-*x*. In a similar way, the second, third and fourth paths would find interferences: segment $A_{10}$ of the second path with *p*-81-*x;* segment $A_6$ of the third path with *m*-26-*z;* and segment $A_3$ of the fourth path with *m*-26-*z*. The fifth path, however, will find no interferences with the equipment and it will be accepted and stored. Note that in the testing of the segments for the fifth path, segment $A_{12}$ of page 5 (see FIG. 15) on the second test against *p*-81-*x* $(Xmin)_E$ will be greater than $(Xmax)_L$:

130.0 > 125.0 Yes; and also on the second test against *m*-26-*z*, $(Xmin)_E$ will be greater than $(Xmax)_L$:

258.0 > 125.0 Yes.

Also, the other two segments $A_8$ and $A_2$ of the fifth path would find a similar response to one of the six tests with each piece of equipment. The actual programs by which this example is applied or introduced to the computer, the IBM 1,620 Machine language, was derived from a FORTRAN program. The program corresponds to the sequence set forth in FIGS. 10 and 11 and further includes the instructions for obtaining the data of tables contained in the specification.

The FORTRAN program is set forth numerically in application number 767,891, filed Sept. 3, 1969, these numbers being here incorporated by reference to avoid extensive reproduction of numbers.

For optimum operation by an ordinary draftsman according to the present invention, reference is made to FIG. 15 which illustrates diagrammatically the several units of the improved system. Referring to FIG. 15 showing an outline plan of the intended procedure, the designer in a plot plan equipment station 70 first forms a plot plan, such as shown in FIGS. 2, 3, 4, 5 and 9. He proceeds then to fill in data upon a questionaire from accumulated data for the system illustrated. That questionaire form comprises a coding sheet as shown in FIGS. 16 and 20 with delineated columns each bearing a heading for appropriate information needed for each column either in simple understandable layman's terms or itself in draftsman's language including coded symbols understandable to him. That form of FIG. 16 orients the equipment as to its position, its dimensions or reference measurement and location with respect to other units in the plot plan. FIG. 20 lists actual specification data identifying the type, size or capacity of each specific piece of equipment.

As shown in FIG. 18, three pieces of equipment to be interconnected as a plot plan have their dimensional data positioned and located with respect to each other or to a centerline entered upon the plot plan drawing. Normally some of that data need not appear on a plot plan but comprises only measurement data obtained by the draftsman from the plot plan and entered upon his questionaire form. It is emplaced here for purposes of illustrating the transfer of that drawing to the data sheet comprising FIG. 16. It will be observed that the numerical and dimensional data appearing in FIG. 18 appears correspondingly in columnar form in the "questionaire" in FIG. 16 which serves as a data chart to identify and orient the equipment shown in FIG. 18. Thus all of the numbers which appear in FIG. 16 are typical symbols as may appear upon an ordinary engineering drawing illustrated in FIG. 18 in plot plan form; and the draftsman would understand each of the numbers and could readily transfer or apply the figures to the chart form of FIG. 16.

A second data questionaire form is used to supply the size and shape information and that information is obtained from equipment specification sheets i.e., the form in which various pieces of equipment used in the plant are identified in size and dimension. Reference for such equipment data sheet is shown in FIG. 20. To more clearly understand the distinction between the two types of questionaires, it will be noted that the data in FIG. 16 is location and orientation data for the tanks illustrated as a plot plan in FIG. 18; the data in FIG. 20 is size and shape information for the same tanks of the plot plan of FIG. 18 as was oriented tabularly in the data sheet of FIG. 16. The second kind of questionaire as shown in FIG. 20 is filled out in separate catagories for each type of equipment piece i.e., pumps are all listed on one sheet; valves in another; tanks in a third. A typical data sheet for cylindrical tanks with saddle support is illustrated in FIG. 18 and is tabulated in FIG. 20. In effect, therefore, the information obtained in both types of questionaire differ fundamentally, the first of FIG. 16 comprising data measured from the plot plan locating and orienting the equipment appearing there and is called for purposes of identification herein the plot plan questionaire; and the second of FIG. 20 defining the size and shape of equipment to be placed into the system, herein termed equipment data questionaire.

Figure 17:
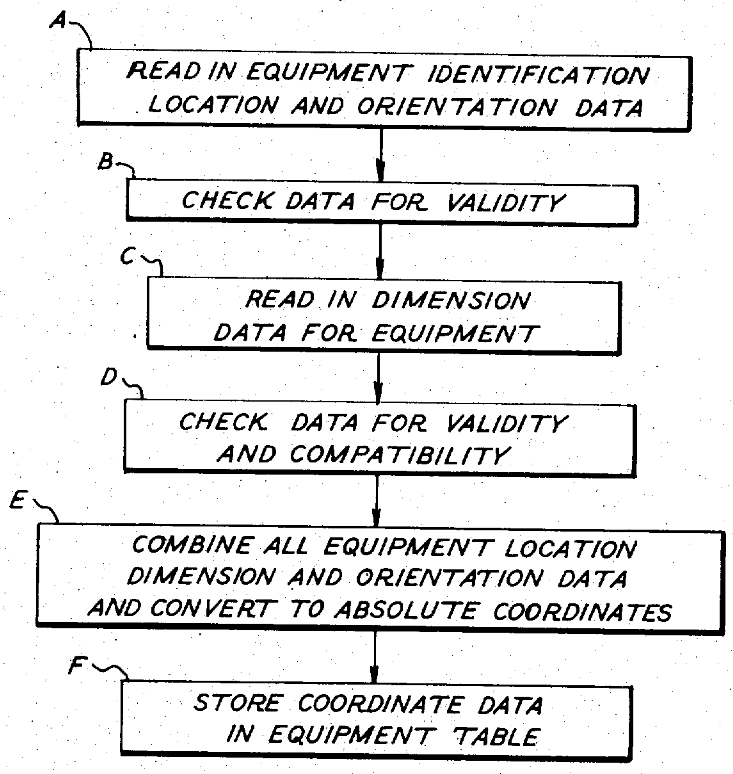
Figure 17A:
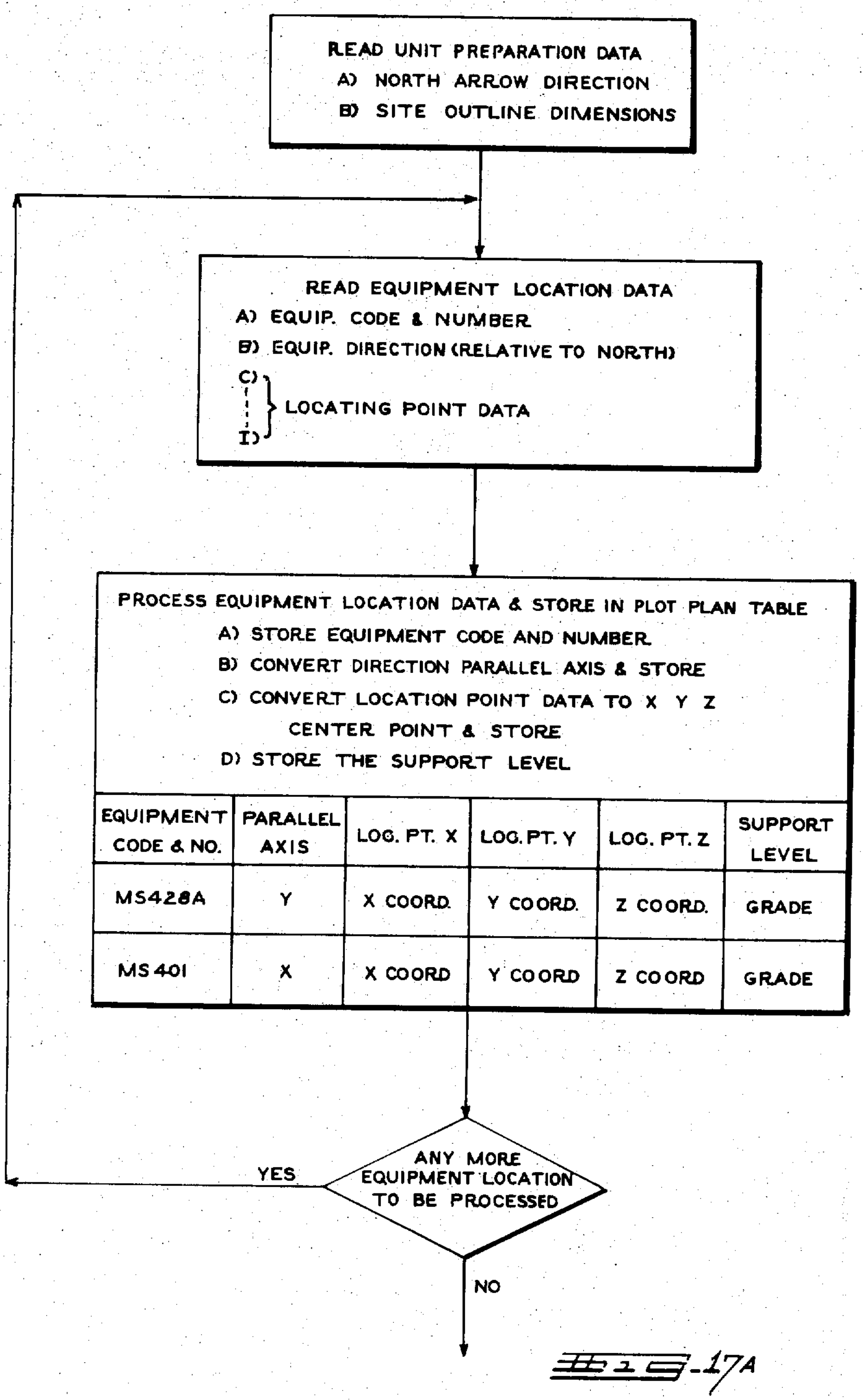
Figure 17B:
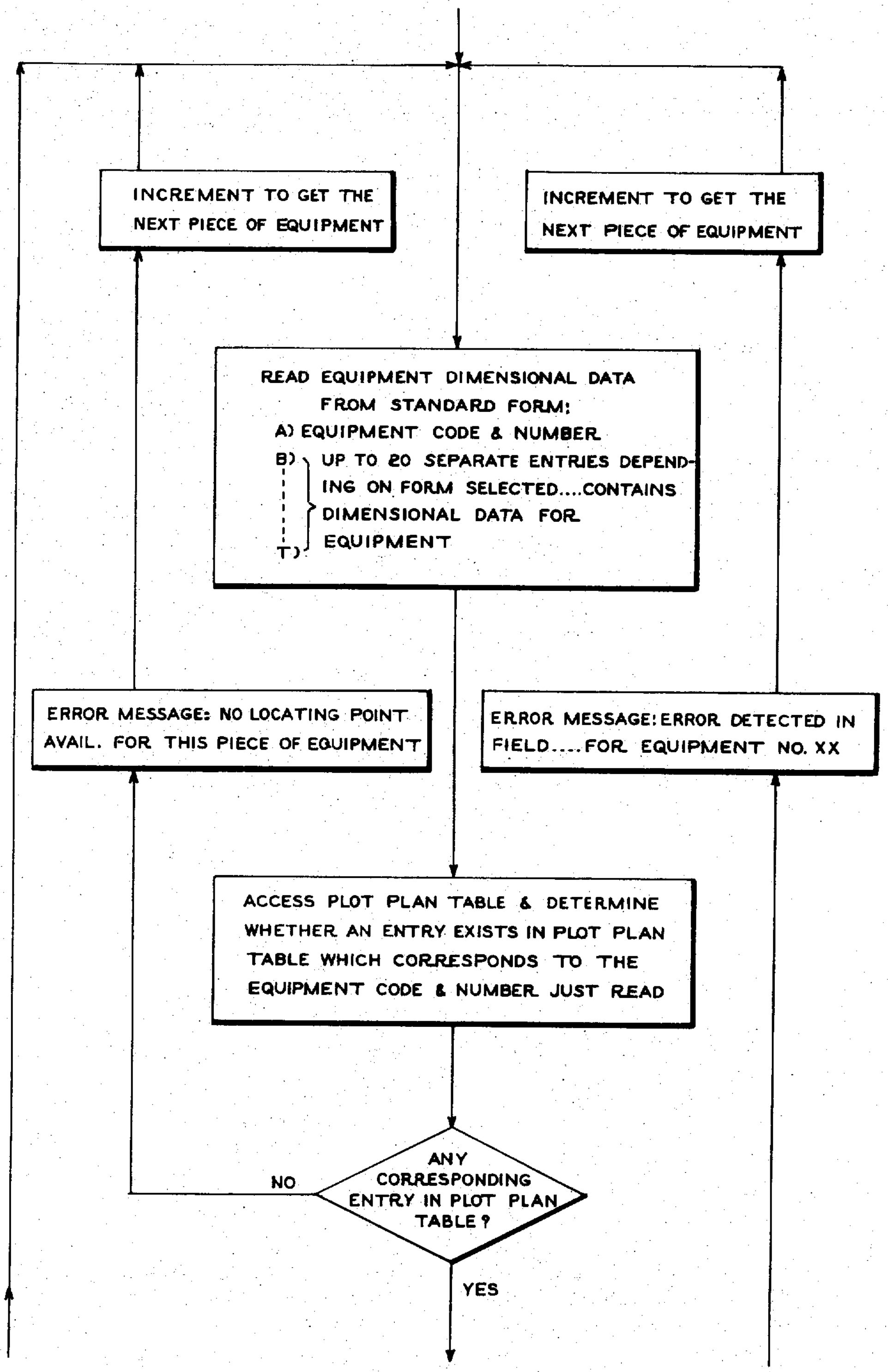
Figure 17C:
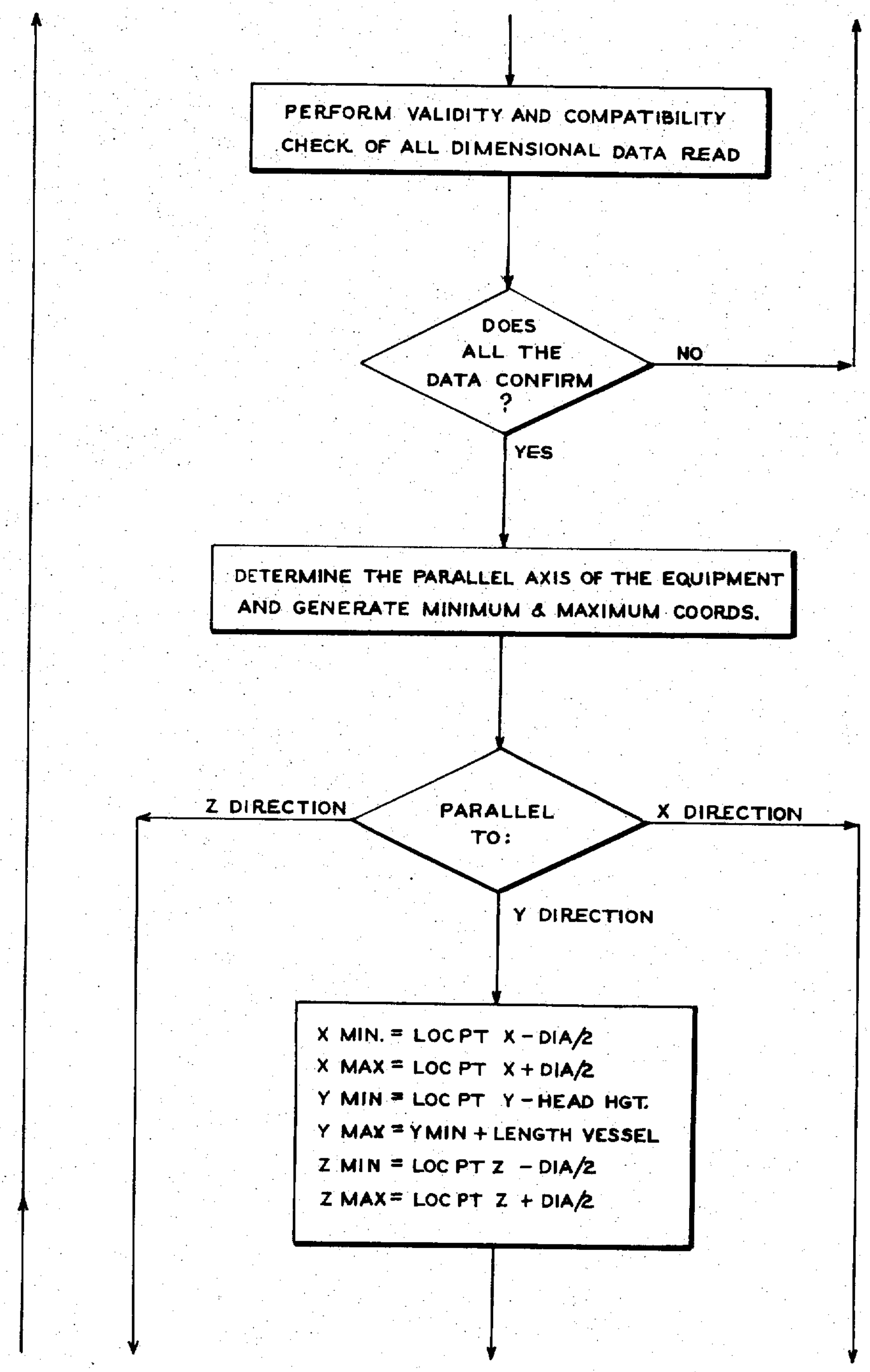
Figure 17D:
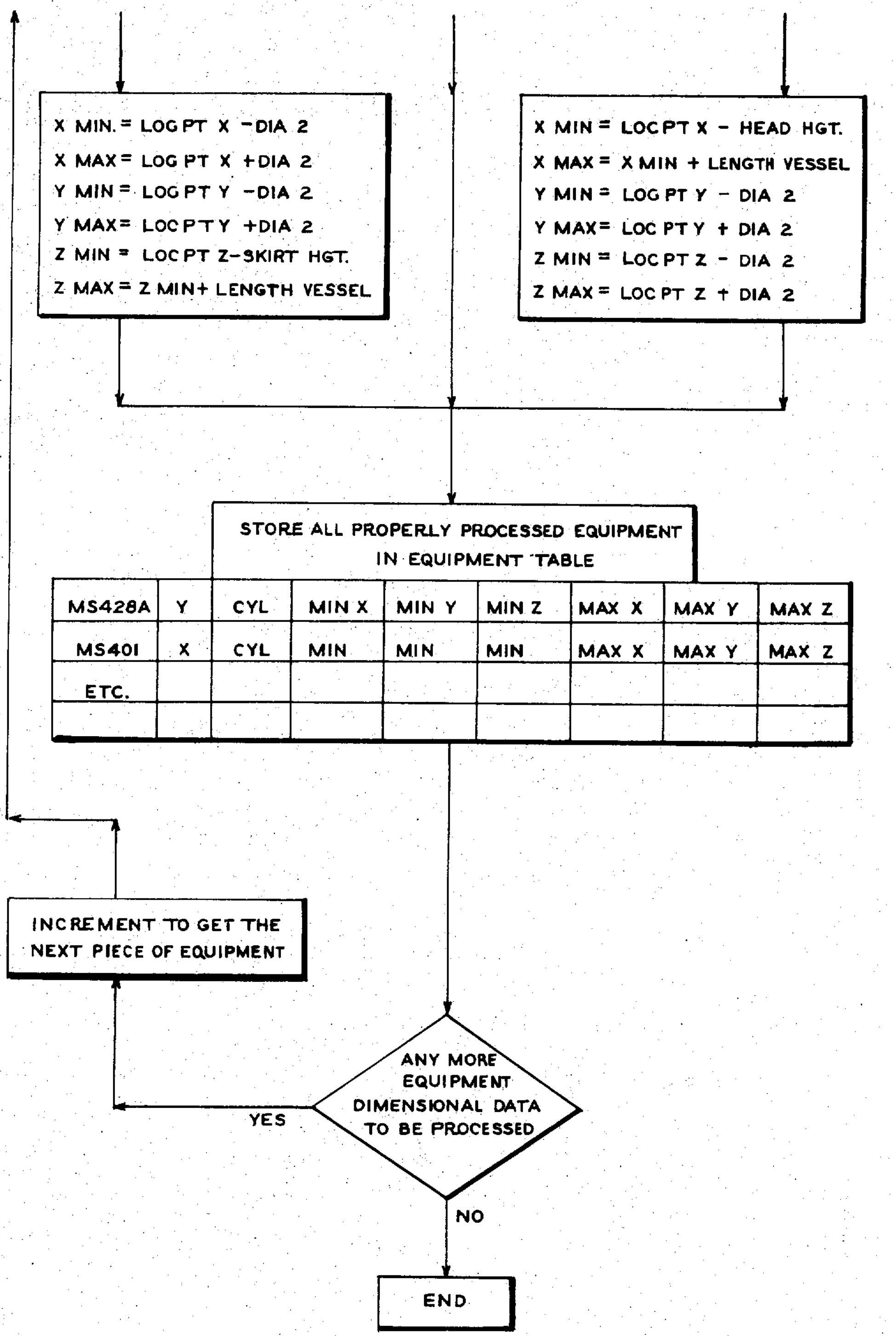

The processing procedure for handling the data of the equipment for operating in the present system is shown in FIG. 17. The questionaires, identified in FIG. 15 as 72, are sent first through a keypunching unit 74 for conversion to data card form and passed thence to a preprocessing computer 76. That reprocessing computer or 'pre-processor' 76 may be a minicomputer which is programmed to convert this ordinary draftsman's data appearing on the punched cards to coded form which the computer can use and is passed thence as a program to the hose computer 78. It is also possible to program the host computer 78 to do its own preprocessing of the same data that was handled in the preprocessor 76.

Procedurally the specific programming steps to accomplish the preprocessing are shown in FIG. 17. In Block A the equipment identification, location and orientation data is read into the computer. In Block B the operation is to check for consistency and whether the reference data to locate the equipment is exact and quite adequate. In the event error is found, identification thereof is printed out, and further processing of that piece of equipment is discontinued. Thereafter the data in Block C for the equipment identified in dimension Block A is read into the unit so that Block C represents a series of short programs as designed to read data for a particular type of equipment all in terms of the accepted basic dimension unit. In Block D, again, the dimension data is checked for compatibility and validity, particularly to determine whether the identification matches the equipment read in Block A, checking to determine whether the data is sufficient to completely describe the piece of equipment. With such checking the equipment location and orientation data can be combined with the equipment dimension data to produce data convenient to the input processing program. In Block E all of the data as related to each piece of equipment is processed as a combination to generate a set of variables convenient to the input program. For instance, it includes converting the location of equipment into absolute coordinates with respect to a graphic origin rather than dimensions relative to some other piece of equipment or centerline or even some support element. In Block F the absolute coordinates generated from the two sources of input data are stored in the table of equipment information. In this manner the input data is passed to the main computer from original draftsman's language, checked and verified to consistent dimensional terms in absolute coordinates, fully orienting and emplacing equipment, including orientation of their connecting point nozzles in the memory of the computer. The computer has been, as described above, programmed with other desired limits.

The logic flow diagrams of FIGS. 17 and 22 illustrate the operation of the preprocessing in logic diagram form.

Any of the many views according to another aspect of this invention may now be graphically shown on the face of a cathode ray tube 80 for purposes of editing by the draftsman. The face of such cathode ray tube is shown in detail in FIG. 19. That cathode ray tube allows correction by light pencil of any view of the drawings at any sale to be exhibited for purposes of light pencil correction or editing by the draftsman and the corrected detail is returned to the host computer. The details of that procedure are described below.

The output of the host computer 78 goes to a plotter sub-system 82 which may include a high speed drum plotter 84 having its own minicomputer 86 for further editing and updating of the printed output of the host computer, modifying or editing it, and passing the same to a finished drawing final plotter 88. The computer also may pass its output to a printer 90 for storage of the computed data in a unit 92.

EXAMPLE II

A system comprising three tanks is drawn by the draftsman in a plot plan as shown in FIG. 18. These tanks are oriented according to a centerline in which the exact measurements are set forth in FIG. 18 for purposes of this example. One of the tanks, MS 417, is diagonally oriented to show that type of arrangement or orientation in the system. It will generally be noted, referring back to FIG. 18, that the position of each nozzle, that is, the points to be interconnected in each tank, are also dimensionally indicated. This plot plan, however, will not ordinarily contain size as appearing in this figuire. Rather, the draftsman after drawing the three tanks emplaced as shown, will fill out the questionaire form as shown in FIG. 16. Therein, it will be noted, that each of the tanks identified in FIG. 18 have the same location data listed in columns. The draftsmans will then proceed to fill in the measurement data as appearing in such columns in a first form as shown in FIG. 16; and will then also supply the size data available from other information sources for each of the units as listed in FIG. 20. These include dimensions available from such other sources for the same tanks.

As a next step, both questionaires are transferred to punched data cards and then sent to the minicomputer, first checking, as shown in FIG. 17, the accuracy of the data in each of the separate steps of that figure. The minicomputer will transpose the draftsman's data to coded algorithmic form. In that manner the plot plan then is passed coded into the memory of the host computer 78 which then, in turn, may have various elements of the semi-finished drawing removed in partial views upon the graphic sub-system 80 for further correction as may be desired, and finally printed out as shown in FIG. 15.

For purposes of correcting the semi-completed information in the host computer, the graphical sub-system 80 as shown in FIG. 19, comprises a main drawing display area 94 which will display a graphics data base as well as a section of a piping drawing taken from the host computer. Marginally about the display area 94 are auxiliary areas in which are placed data useful for modifying the display area.

The total function of the graphics sub-system may be divided as programming into five major areas. These consist of view generation; view editing; equipment and nozzle editing; line editing; and notation editing. The draftsman-designer will modify whatever section or view that is generated in the drawing display area by using the marginal portions to assist him in making changes needed in the several programmed sections as listed. To assist him in editing the programmed sections in the several areas, the marginal areas as shown in FIG. 19 comprise a permanent function item display area 96; a conditional function item display area 98; a major function memory display area 100; an input item display area 102; a typewriter input display area 104; a special display area 106; a prompt card display area 108; and an error card display area 110; as shown and marked thereon.

One or more of these areas depending upon the phase of the program being edited, as listed above, will have marginal card information displayed, useful to assist the draftsman to make the needed changes in the displayed view. He will proceed to add elements by light pen; to remove or replace lines; add valves, bends, turns and other piping elements; and relocate such lines or elements as may be needed in portion by portion and in various views of the drawings until the changes are completed.

The following example illustrates the cathode ray tube modification of drawings.

EXAMPLE III

To illustrate the interactive technique to graphically demonstrate how to modify a line description produced by the automatic data processing, a series of line diagrams are shown in FIGS. 21*a* – 21*q*. Each diagram is a line picture reproduced in area 94 of FIG. 19 as the drawing display area thereof; and the several diagrams illustrate the routine applied to move from change to change displaying each change as they occur upon the cathode ray tube in the drawing display area. It will be noted that the several programs usually available as program functions are listed as follows:

| | |
|---|---|
| AIPINT | Initiate the interactive piping program |
| AVUDSP | Display an APD view |
| AIPSET | Set the interactive piping initial conditions |
| AITLST | List the display item description |
| AIPFIN | Finish the interactive piping program |
| AVUEDT | Edit view that was generated or display view |
| AVUSET | Set the view parameters |
| AVUGEN | Generate an APD view |
| AVUSCL | Scale the display view |
| AVUCMP | Compose the display view |
| AVULST | List all views that have been generated |
| AVUFCH | Fetch the parameters for the display view |
| AVUPLT | Set the value to plot the display view or a generated view |
| AENEDT | Edit the equipment and nozzle descriptions |
| AENFIN | Finish the equipment and nozzle descriptions |
| ALIEDT | Edit the APD line descriptions |
| AELDLT | Delete the vector and/or fitting elements of a line |
| AFIADD | Add a fitting segment to an APD line |
| AVCADD | Add a vector segment to an APD line |
| ALIFRM | Form the APD line definition |
| ANOEDT | Edit the notation of a view |
| ANOFIN | Finish the notation on a view |

In FIG. 21A, the routine that produced the display outside of the drawing display area was AIPSET, that diagram illustrating the initial interactive piping technique. Each of the diagrams reproduced in FIGS. 21 upon the cathode ray tube of the drawing display area 94 are sensitive to the use of the light pencil and changes may be so made.

The section numbers included in the data for each of FIGS. 21A - Q are the sections shown in FIG. 19.

No input was required for FIG. 21A and it could have been entered from any other program by the deisgner properly selecting the funtion item (RESET). According to this Example the last program will be ALIEDT in which the function item (LINE) is selected. This is indicated by the conditional function item in area 98 of FIG. 19 as line E&N notation is in that area. The prompt card display in area 108 of diagram FIG. 21A asks the designer to provide "input items as well as a function item" and the diagram FIG. 21C would have occurred. In this example no input was provided so that the line displayed in area 94 was according to that shown in the diagram FIG. 21B. In each of these instructions the parenthetical instructions indicate the designer's input on diagrams FIGS. 21B, D, F, G, H, I, K, L, M, N and O. On diagrams FIGS. 21C, E, G, H, I, J, L, M, N, O, P and Q the parenthetical expressions in section 94 indicate the program function response and are not displayed.

In each of these diagrams of FIGS. 21$a-q$, the marginal notations accompanying the line diagrams $a$ — $q$ are also listed and the data for each is as follows:

A INTERACTIVE PIPING SET

| | |
|---|---|
| Input | No input required |
| Function item selected | Any program (RESET) |
| Phase Name | IPSE |
| Program Name | AIPSET |
| Program Number | 14 |
| Next Program | ALIEDT (LINE) |
| Section 98 | Line E&N notation |
| Section 96 | View Data Reset - End |
| Section 108 | Select input items and a function |

B LINE EDIT

| | |
|---|---|
| Input | (No input items on stack) |
| Function item selected | IPSET (LINE) |
| Phase Name | LIED |
| Program Name | ALIEDT |
| Program Number | 41 |
| Next Program | ALIEDT (LINE) |
| Section 94 | (When line is selected with the light pen it will blink) |
| Section 96 | View Data Reset - End |
| Section 98 | Delete fitting X vector Y vector Z vector skew vector - finish |
| Section 100 | Line |
| Section 108 | Select a line in drawing to be edited and a line editing function |

C LINE EDIT

| | |
|---|---|
| Input | A line item on input stack |
| Function item selected | ALIEDT (LINE) |
| Phase Name | LIED |
| Program Name | ALIEDT |
| Program Number | 41 |
| Next Program | ASGDLT (DELETE) |
| Section 94 | (The line has been redisplayed with each element penable) |
| Section 96 | View data reset - End |
| Section 98 | Delete fitting X vector Y vector Z vector skew vector - finish |
| Section 100 | Line |
| Section 108 | Select line elements and line editing function |

D ELEMENT DELETE

| | |
|---|---|
| Input | No input items on stack |
| Function item selected | ALIEDT (DELETE) |
| Phase Name | ELDL |
| Program Name | AELDLT |
| Program Number | 42 |
| Next Program | AELDLT (DELETE) |
| Section 94 | (When elements are selected they will blink) |
| Section 96 | View data reset - End |
| Section 98 | Delete |
| Section 100 | Line |
| Section 108 | Select the line elements to be deleted |

E ELEMENT DELETE

| | |
|---|---|
| Input | One or more lines on input stack |
| Function item selected | AELDLT (DELETE) |
| Phase Name | ELDL |
| Program Name | AELDLT |
| Program Number | 42 |
| Next Program | ALIEDT (Directly) |
| Section 94 | (Selected elements are erased) |
| Section 96 | View data reset - End |
| Section 98 | Delete fitting X vector Y vector Z vector skew vector - finish |
| Section 100 | Line |
| Section 108 | Select line elements and line editing function |

F VECTOR ADD

| | |
|---|---|
| Input | No input items on stack |
| Function item selected | ALIEDT (Z VECTOR) |
| Phase Name | VCAD |
| Program Name | AVCADD |
| Program Number | 44 |
| Next Program | AVCADD (Z VECTOR) |
| Section 94 | (When element is selected it will blink) |
| Section 96 | View data reset - End |
| Section 98 | Z vector |
| Section 100 | Line |
| Section 108 | Select a line element to indicate the vector start point |

G VECTOR ADD

| | |
|---|---|
| Input | A start point is on stack |
| Function item selected | AVCADD (Z VECTOR) |
| Phase Name | VCAD |
| Program Name | AVCADD |
| Program Number | 44 |
| Next Program | AVCADD (Z VECTOR (CR) |
| Situation | A vector to be added out of plane |
| Section 94 | (Selected element is blinking when Z level element is selected it will blink) |
| Section 96 | View data reset - End |
| Section 98 | Z vector |
| Section 100 | Line |
| Section 108 | Select an element or type a value to indicate the vector end point |

H VECTOR ADD

| | |
|---|---|
| Input | A valid item on stack or a valid typewriter input |
| Function item selected | AVCFIN (Z VECTOR) (CR) |
| Phase Name | VCAD |
| Program Name | AVCADD |
| Program Number | 44 |
| Next Program | ALIEDT (Direction) |
| Situation | Vector to be added out ot plane |
| Section 94 | (When start point is selected for next vector it will blink Out of plane vector is displayed) |
| Section 96 | View data reset - End |
| Section 98 | Delete fitting X vector Y vector Z vector skew vector - Finish |
| Section 100 | Line |
| Section 108 | Select line elements and line editing function. |

I VECTOR ADD

| | |
|---|---|
| Input | A start point is on stack |
| Function item selected | ALIEDT (X VECTOR) |
| Phase Name | VCAD |
| Program Name | AVCADD |
| Program Number | 44 |
| Next Program | AVCADD (X VECTOR) |
| Situation | Vector to be added in plane |

-Continued

| | |
|---|---|
| Section 94 | (Cross moves to start point Selected element is blinking A line in the X direction will be drawn from the start point to the X position of the cross while the cross is being moved) |
| Section 96 | View data reset - End |
| Section 98 | X vector |
| Section 100 | Line |
| Section 108 | Select item or move cross to indicate a vector end point |

J VECTOR ADD

| | |
|---|---|
| Input | Cross X position is a valid input |
| Function item selected | AVCADD (X VECTOR) |
| Phase Name | VCAD |
| Program Name | AVCADD |
| Program Number | 44 |
| Next Program | ALIEDT (Directly) |
| Situation | Vector added in plane |
| Section 94 | (Vector is displayed) |
| Section 96 | View data reset - End |
| Section 98 | Delete fitting X vector Y vector Z vector skew vector - Finish |
| Section 100 | Line |
| Section 108 | Select line elements and line editing function |

K FITTING ADD

| | |
|---|---|
| Input | No input items on stack |
| Function item seleted | AFIADD (FITTING) |
| Phase Name | FIAD |
| Program Name | AFIADD |
| Program Number | 43 |
| Next Program | AFIADD (FITTING) |
| Section 94 | (When element is selected it will blink) |
| Section 96 | View data reset - End |
| Section 98 | Fitting |
| Section 100 | Line |
| Section 108 | Select a line element to indicate the fitting start point |

L FITTING ADD

| | |
|---|---|
| Input | Valid start point is on stack |
| Function item selected | AFIADD (FITTING) |
| Phase Name | FIAD |
| Program Name | AFIADD |
| Program Number | 43 |
| Next Program | AFIADD (FITTING) (CR) |
| Situation No. 2 | A start point is on stack |
| Section 94 | (Selected element is blinking) |
| Section 96 | View data reset - End |
| Section 98 | Fitting |
| Section 100 | Line |
| Section 104 | XXXXX Illegal code for fitting will be typed now |
| Section 108 | Select fitting or type fitting of fitting to be AFIADD in line |

M FITTING ADD

| | |
|---|---|
| Input | An invalid item or an invalid fitting typed code |
| Function item selected | AFTADD (FITTING) (CR) |
| Phase Name | FTAD |
| Program Name | AFTADD |
| Program Number | 43 |
| Next Program | AFTADD (FITTING) (CR) |
| Section 96 | View data reset - End |
| Section 98 | Fitting |
| Section 100 | Line |
| Section 104 | XXXX Legal code for a flanged gate valve will be typed now |
| Section 106 | XXXX (invalid item or typewriter input) |
| Section 108 | Select a fitting or type A fitting code for fitting to be placed in line |

-Continued

| | |
|---|---|
| Section 110 | An invalid item was selected or an invalid fitting code typed |

N FITTING ADD

| | |
|---|---|
| Input | A valid fitting on stack or on typewriter input |
| Function item selected | AFTADD (FITTING) (CR) |
| Phase Name | FTAD |
| Program Name | AFTADD |
| Program Number | 43 |
| Next Program | ALIEDT (Direction) |
| Section 94 | (Fitting is displayed When element is selected it will blink) |
| Section 96 | View data reset - End |
| Section 98 | Delete fitting X vector Y vector Z vector skew vector - Finish |
| Section 100 | Line |
| Section 108 | Select line elements and line editing function |

O VECTOR ADD

| | |
|---|---|
| Input | A start point is on stack |
| Function item selected | ALIEDT (X VECTOR) |
| Phase Name | VCAD |
| Program Name | AVCADD |
| Program Number | 44 |
| Next Program | AVCADD (X VECTOR) |
| Situation | Vector to be added in plane |
| Section 94 | (Selected item is blinking Cross moves to start point When end point item is selected it will blink) |
| Section 96 | View data reset - End |
| Section 98 | X Vector |
| Section 100 | Line |
| Section 108 | Select an item or move cross to indicate the vector end point |

P VECTOR ADD

| | |
|---|---|
| Item | End point item on input stack |
| Function item selected | AVCADD (X VECTOR) |
| Phase Name | VCAD |
| Program Name | AVCADD |
| Program Number | 44 |
| Next Program | ALIEDT (Directly) |
| Situation | A vector to be added in plane |
| Section 94 | (New vector displayed This vector was edited to accommodate new vector) |
| Section 96 | View data reset - End |
| Section 98 | Delete fitting X vector Y vector Z vector skew vector - Finish |
| Section 100 | Line |
| Section 108 | Select line elements and line editing function |

Q LINE FORM

| | |
|---|---|
| Input | No items on input stack |
| Function item selected | ALIEDT (FINISH) |
| Phase Name | LIFI |
| Program Name | ALIFRM |
| Program Number | 45 |
| Next Program | AIPSET (Directly) |
| Situation | Line elements from a closed line from nozzle to nozzle |
| Section 94 | (The line is redisplayed as a single penable item) |
| Section 96 | View data reset - End |
| Section 98 | Line E&N notation |
| Section 108 | Select input items and a function |

The computer by extra programming may be made to sum up any of the structural elements of the completed design. For instance, the computer may be made to sum up the amount, quantity, number, price, or a composite, of pipe of any selected size or other structural components of the system being designed. It may be made to sum up the number of valves, turns, T's, unions, flanges, etc. It may be made to count piping and similar structural elements, size and weight relationship as well as cost relationship including length, weight, and cost of the pipe as well as connections, unions, T's, valves, pumps, etc. by appropriate programming of the computer. After the printed drawing is finished, the computer also will print out the weight, size and unit quantity as data upon a separate sheet. The practice is quite valuable to provide, even at an intermediate stage, quick estimates of material costs and quantities that will be needed to effect the completed design.

EXAMPLE IV

The computer is programmed to count the length of each piece of pipe selected to interconnect origin and destination nozzles as described in FIGS. 10 and 11. As the program proceeds, according to Example I following the procedure shown in FIGS. 10 and 11, a code symbol indicating the size of the piping to interconnect the points according to that program is programmed to the computer. The computer, then, according to Example III, has unions, joints, couplings, emplaced in the system and these elements are by the same programming counted as they are emplaced in the memory of the computer. After completion of the final drawing, the computer then has printed out the size and weight factors, or by programming by size/cost factors per unit length, the actual cost of the pipe is printed out on a separate data sheet.

Obviously the programming of all of the material into the computing machine as complete data serves the dual purpose of having all of the data operate, one part as a limit upon the next, whereby the line computations result after consideration of all of the data; and secondly, since all of the line computations are retained in the memory of the machine, it is possible to suppress selected portions of the available data and thus produce a desired view in separate planes. Moreover, any plane may arbitrarily be selected to visibly reproduce the data available in the memory of the computer as lines visible in that plane.

Figure 9:
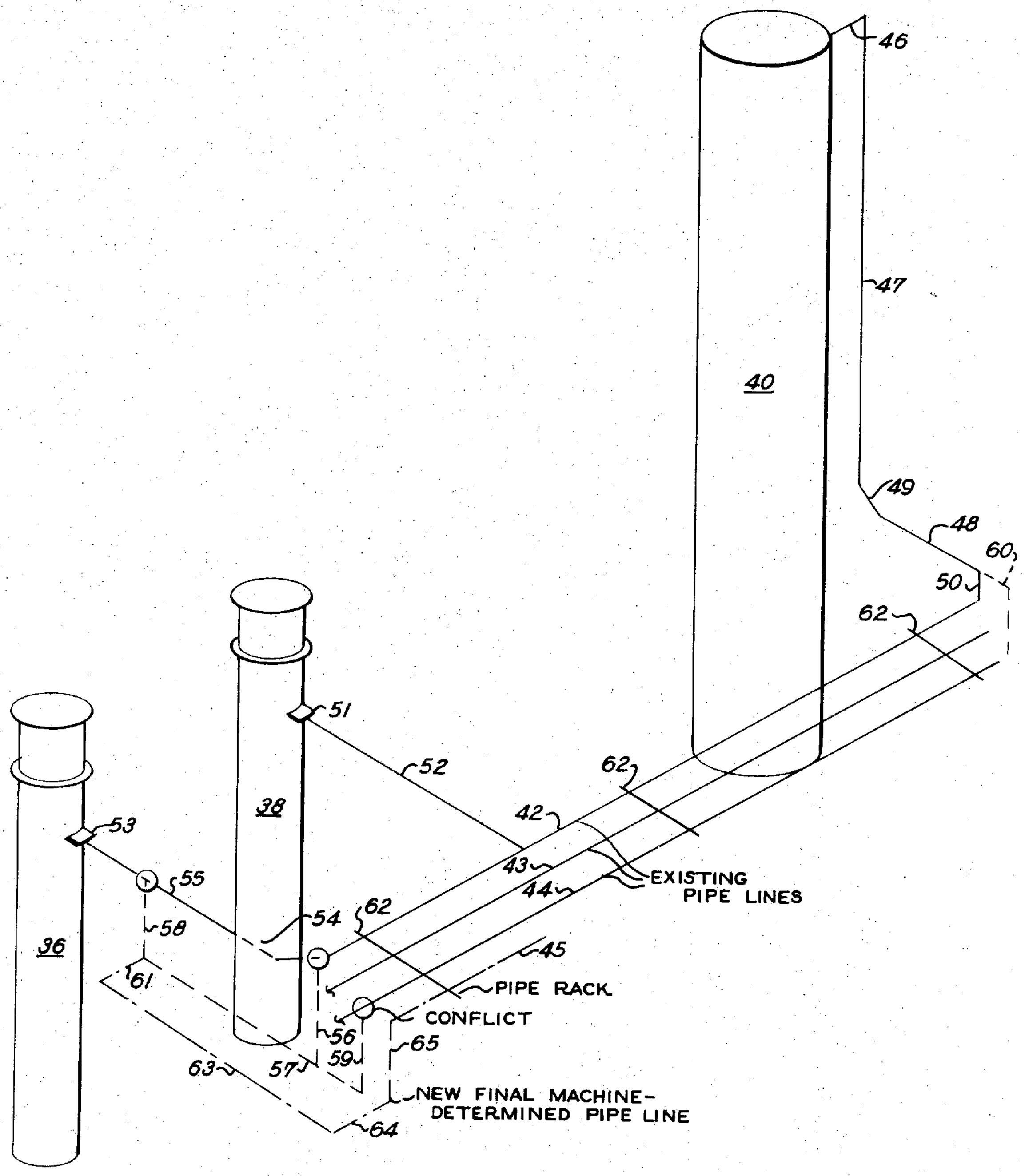
FIG. 9 is an isometric view illustrating several interconnected units, and the manner in which the computer exercises its normal free-hand choice to design the piping paths.

The principle by which the computer actually operates to "draw" the several lines in its memory, and first shown in very elementary form in FIGS. 8 and 10, is further illustrated more specifically, practically or sophisticatedly in FIG. 9. That figure shows three towers 36, 38 and 40 to be interconnected by some of several pipes 42, 43 and 44, longer portions of which are to lie parallel, symmetrically stacked for easy interconnection and servicing upon a pipe rack which comprises several supports or brackets 62. The tower 40 is interconnected with one end of the pipe 42, the exact location of its nozzle being hidden from view, but which is available following several bends for interconnection to the far end thereof, 46. A center interconnecting portion of that pipe 47 illustrates that a portion of the pipe may follow one of the programmed limits to lie parallel but not to pass closer to the tower 40 than certain fixed limits, to avoid heat exchange therewith, except in the portion 46 approaching the nozzle. The intermediate portion 48 is connected by suitable bends 49 and 50 to the long body of the pipe 42, whereby each of these pipe sections is parallel to one of the X, Y and Z axes for the bulk of their running lengths.

The system as shown in FIG. 9 may permit or require interconnection of another end of the pipe 42 with the tower 38 through a nozzle 51, the connecting pipe being a line 52 having the same vertical dimension as the pipe 42. Other data in the system, however, may require connection of an end of pipe 42 with the tower 36 by way of nozzle location 53, which might have caused that pipe 42 to run directly into the tower 38, or to pass through it according to dotted line portion 54 in order to continue in its fixed direction through line 55, to connect with nozzle 53. However, since one of the program limits is that no pipe line may intersect another, except when directed to do so as in the case of pipe 52, or be located so as to run into some obstruction, the computer proceeds to compute its way around the obstruction, following any of several alternate paths of the type shown in FIG. 8. For instance, the computer may attempt to pass the pipe under the unit 38 in the lower Y direction, passing first from the end of pipe 42 by way of dotted line 56, and then through pipe 57 under the tower 38, and then bending to vertical by line 58 to connect with line 55, and thus completing its connection with nozzle 53.

It would have been possible, of course, to follow other alternate paths as shown. For instance, the pipe 57 might connect through an alternate vertical leg 59 into a pipe 44, disposed a further distance away from 42 but parallel to the pipe 44 finally interconnecting with pipe 48 by way of dotted line pipe 60. As a still further alternate, pipe 58 after descending a certain distance (or even pipe 55 without descent) could diverge laterally through a leg 61, continuing thence by a laterally displaced line 63 into lateral return line 64 and leg 65 into a new line 45, the line 63 being thus diverted sufficiently laterally to avoid the tower 38. Thus the computer is flexible, computing several alternate connections with existing lines, or computing a new line 45 as may be necessary to complete the piping within the limits or rules imposed, as may be necessary to avoid any obstructions.

One obvious limiting line condition that will usually be read into the machine for most of the lines is that each line that is drawn will form a limit upon the subsequently determined lines that are to be computed, so that the next computed lines will not intersect or interfere with the preceding lines. It is also possible to provide limits for the next lines following the computation of the first, that they will not come closer than a certain limiting distance, whereby there will be no temperature interchange, no heat transfer. A further limit may be that each line will tend to lie parallel, insofar as possible, to other lines for optimum symmetry of design. Having then completed the connections by the computer as a series of computed points formed in the memory of the computer interconnecting the nozzles, the results can be typed or printed as legible data points which are a visible and storable form that can be read and subsequently used at any time and place. They can be pumched upon cards or tape or impressed upon a magnetic tape from which they may be stored as a subsequently useful form as cards or tape. That information supplied and programmed, or computations thereon, may be stored in the memory of the machine without immediate use, or they may be formed into cards or tapes, etc., and used directly for operation of a drafting machine such as an X-Y plotter, operated by this data output of the computer for visibly illustrating linear data as drawings as illustrated in FIGS. 2, 3, 4 and 9. They are the line drawings which result from operations of an X-Y plotter from data placed into the machine.

The original locations of the units as shown in FIG. 5 may be drawn upon standard graphically sized and cross-lined paper and drawn to scale in terms of the units that will be used by the computer, or some scale multiple thereof, usually in the several views, and of the exact size as would be reproduced by an X-Y plotter. Consequently, the X-Y plotter may have the same data sheet with unpiped units mounted therein and the piping completed by the operation of the stylus thereof directed by the data supply from the computer. However, this is not necessary, since the computer itself having the data therein significant of outlines of the units, comprising squares, circles, triangles and evenly varied curves, mathematically available therein, can also operate the X-Y plotter to reproduce the units themselves as finished drawings, exactly as shown in FIGS. 2, 3 and 4. Thus, since the computer-plotter system has the data defining the minima and maxima in the several orienting directions which constitute or which, following available computations may constitute the boundaries of each unit, the unit themselves are readily reproduced by the X-Y plotter, together with the interconnecting piping, in any of the views desired, from data supplied by the computer.

Figure 1:
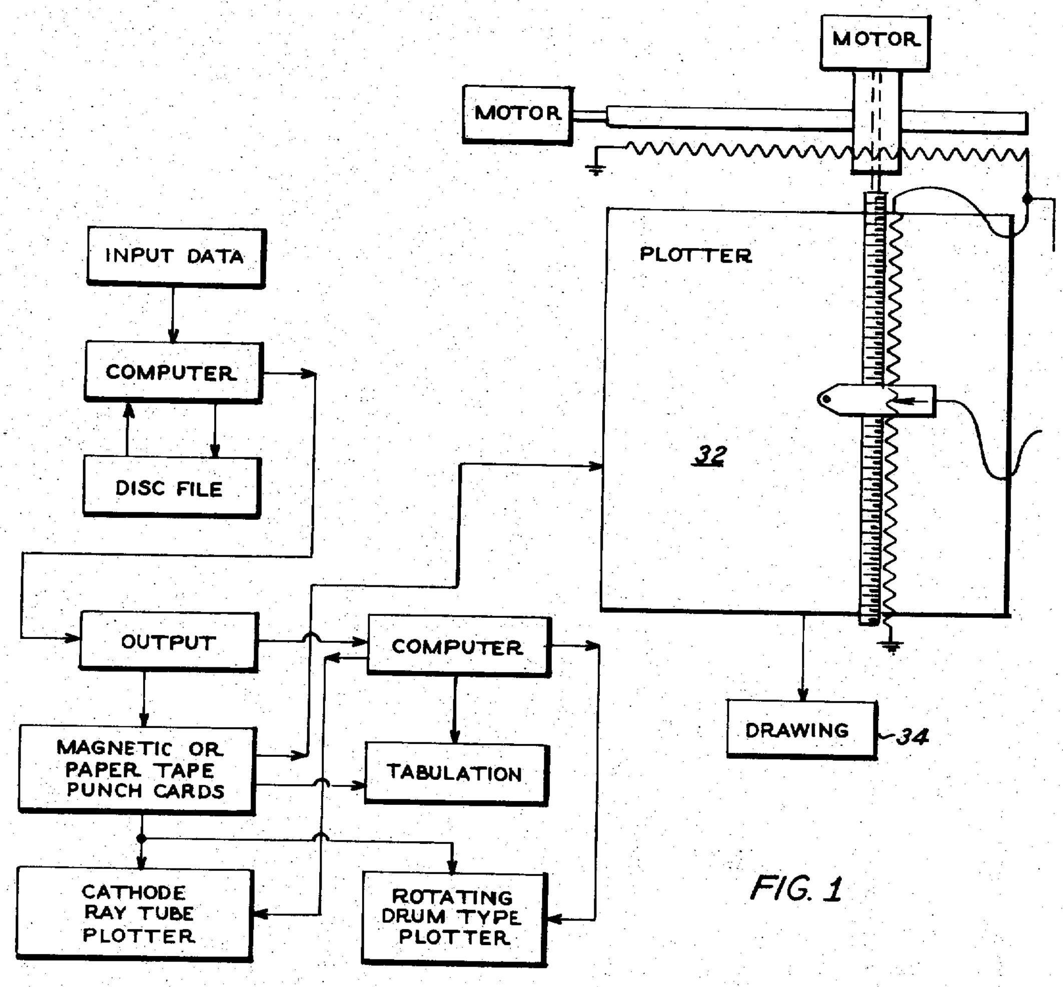
FIG. 1 is a diagram of the process steps and combinations of means for obtaining and supplying of input data and programming to a computer, and the ultimate conversion thereof to visible form.

As shown in the diagram of the total system, FIG. 1, input data, comprising orientation, spacing and dimensioning for the several units of the system are placed into a computing machine from an elementary plot plan. This is followed or preceded by programming of desired limits into the machine to interconnect such data according to the imposed limits or rules. The computer thus can operate to compute the data into linear form which may remain in the machine; or it may be placed in an intermediate punched-card or tapestorage form; or sent directly to a mechanical device which converts the data to visible form as visible lines, such as an X-Y plotter shown diagrammatically at 32. That X-Y plotter is of known construction, being described in detail in U.S. Pat. No. 2,541,277, dated Feb. 13, 1951. There are other known devices which can be used to convert such data to visible line form, such as a Universal Drafting Machine known as an "Orthomat." Since the computer will have been operated to select data lines lying in a selected plane, X-Y, X-Z, Y-Z, planes or combinations thereof, the X-Y plotter will have produced a drawing 34 corresponding to FIGS. 2, 3, 4 or 5. Thus, the computer has been caused to make a full drawing in a given plane as illustrated by these figures.

In forming drawings other than the simplest type where large amounts of data are necessary, the data such as compiled in a long chart, as illustrated in FIG. 7, ready for use by the computer, or after having been further transformed in the memory of the computer to data significant of the lines to be reproduced visibly, may have such data stored at any preliminary intermediate of final stage upon disc files. Such disc file may typically be an IBM 2311 Disc Storage Drive which contains numerous data storge discs mounted between protective plates upon which the data from the computer may be transferred, and returned as needed to the computer to effect a final overall drawing. Thus some of the imput data to the machine may be from the disc file and some may be original input data available from a plot plan converted to the form of FIG. 7. Again, as shown in FIG. 1, the output of the computer may be returned upon magnetic or paper tape or punch cards. It may then be exhibited visually on a cathode ray tube plotter, or as a drawing by an X-Y plotter or even a rotating drum type plotter, typical plotter types known in the art operable from tape or punched cards.

The computer can, of course, be selected to have adequate capacity for the computations involved for the particular size of job. The drawings of FIG. 2, 3 and 4 were made with the aid of an IBM, Model 1620 computer, but numerous other computers, adequate for this and larger computations, are commercially available. Such computers have adequate sophistication to perform numerous other computations which are useful adjuncts to the development of linear data as described. For instance, the computer-plotter system can measure the length of piping; or lengths of different sizes of piping; and count the number of elbows, valves, etc. It is, therefore, within the scope of the present invention, to combine the various useful jobs performable by the computer-plotter system with the compilation of the linear data described.

Various modifications will occur to those skilled in the art whereby linear, interconnecting, or design data is computed from oriented points within certain imposed limits, and linear data can be made visible in drawing form or stored as data. Accordingly, it is intended that the several drawings and the specification be regarded as illustrative and not limiting except as defined in the claims appended hereto.

What is claimed is:

1. The method of designing, interconnecting and visibly illustrating a system of linearly interconnected operating units into a composite operating system, comprising forming a plot plan consisting of a graphical diagrammatic arrangement of each of said operating units with each unit of said system graphically positioned therein in scale dimensions and arranged in three-dimensional space in design position before each unit is interconnected into the system, forming a table of dimensions significant of each unit and the points thereon to be linearly interconnected measured by the designer from any point in the plot plan common to said units in symbols recognizable by a draftsman, programming a computer to convert the said designer's measurement data of said table to coded form acceptable to a computer and orienting said data to the graphical origin of said plot plan, feeding the computer with said coded data, executing programmed steps to impose constraining limits upon said computer to compute and store data representative of said points in the memory of said computer, executing programmed steps to mathematically define a path interconnecting said units to be interconnected within said constraining limits, whereby each line thus defined becomes a limiting exclusion upon the next succeeding lines, and finally converting all of the data in the memory of said computer to visible form comprising a system of said units linearly interconnected through said points.

2. The method as defined in claim 1 wherein the system is a piping system, piping segments serving as said lines to interconnect said units, and the data formed in the memory of said computer is finally converted to visible drawing form defining a piping system interconnecting the units for fluid flow from unit to unit of the system.

3. The method of designing, interconnecting and visibly illustrating a system of linearly interconnected operating units into a composite operating system, comprising forming a plot plan consisting of a graphical diagrammatic arrangement of each of said operating units with each unit of said system graphically positioned therein in scale dimensions and arranged in three-dimensional space in design position before each unit is interconnected into the system, forming a table of dimensions significant of each unit and the points thereon to be linearly interconnected measured by the designer from any point in the plot plan common to said units in symbols recognizable by a draftsman, forming at least one second listing of data in tabular form identifying units to be emplaced in said system in terms of their operating and identifying specifications, programming a computer to convert the said designer's measurement data of said first table and to convert the operating unit identifying data of other tables to coded form acceptable to a computer and orienting said data to the graphical origin of said plot plan, feeding the computer with said coded data, executing programmed steps to impose constraining limits upon said computer to compute and store data representative of said points in the memory of said computer, executing programmed steps to mathematically define a path interconnecting said units to be interconnected within said constraining limits, whereby each line thus defined becomes a limiting exclusion upon the next succeeding lines, and finally converting all of the data in the memory of said computer to visible form comprising a system of said units linearly interconnected through said points.

4. The method as defined in claim 3 wherein the system is a piping system, piping segments serving as said lines to interconnect said units, and the data formed in the memory of said computer is finally converted to visible drawing form defining a piping system interconnecting the units for fluid flow from unit to unit of the system.

5. The method of designing, interconnecting and visibly illustrating a system of linearly interconnected operating units into a composite operating system, comprising forming a plot plan consisting of a graphical diagrammatic arrangement of each of said operating units with each unit of said system graphically positioned therein in scale dimensions and arranged in three-dimensional space in design position before each unit is interconnected into the system, forming a table of dimensions significant of each unit and the points thereon to be linearly interconnected measured by the designer from any point of said plot plan common to said limits in symbols recognizable by a draftsman, converting the measurement data of said table to coded form acceptable to a computer, feeding the computer with said coded data, executing programmed steps to impose constraining limits upon said computer to compute and store data representative of said points in the memory of said computer, executing programmed steps to mathematically define a path interconnecting said units to be interconnected within said constraining limits, whereby each line thus defined becomes a limiting exclusion upon the next succeeding lines, graphically printing out selected views of said design upon a cathode ray tube operative to be modified by a light pencil, programming corrections by way of said graphic printout upon the cathode ray tube to effect intermediate modifications of the data in the memory of said computer, and finally converting all of the data in the memory of the computer to visible form comprising a system of said units linearly interconnected through said points.

6. The method as defined in claim 5 wherein the system is a piping system, piping segments serving as said lines to interconnect said units, and the data formed in the memory of said computer is finally converted to visible drawing form defining a piping system interconnecting the units for fluid flow from unit to unit of the system.

7. The method of designing, interconnecting and visibly illustrating a piping system of linearly interconnected operating units into a composite operating system, comprising, forming a plot plan consisting of a graphical diagrammatic arrangement of each of said operating units with each unit of said system graphically positioned therein in scale dimensions and arranged in three-dimensional space in design position before each unit is interconnected into the system, forming a first table of said dimensions significant of the size and orientation of each unit and the points thereon to be linearly interconnected measured by the designer from any point in the plot plan common to said units in symbols recognizable by a draftsman, programming a computer to convert the measurement data of said first table to coded form acceptable to a computer and to convert the said orienting data to the graphical origin of said plot plan, forming at least one second table listing data identifying units to be emplaced in said piping system in symbols recognizable by a draftsman and programming a computer to convert the data of said second tabularly listed data to a coded form acceptable to a computer, feeding the computer with said coded data, executing programmed steps to impose constraining limits upon said computer to compute and store data representative of said points in the memory of said computer, executing programmed steps to mathematically define a path interconnecting said units to be interconnected within said constraining limits, whereby each line thus defined becomes a limiting exclusion upon the next succeeding lines, graphically printing our selected views of said design upon a cathode ray tube operative to be modified by a light pencil, programming corrections by way of said graphic printout upon the cathode ray tube to effect intermediate modifications of the data in the memory of the said computer, and finally converting all of the data in the memory of said computer to visible form comprising a system of said units linearly interconnected by piping through said points.

8. The method of designing, interconnecting and visibly illustrating a system of operating units linearly interconnected by piping into a composite operating system, comprising forming a plot plan consisting of a graphical diagrammatic arrangement of each of said operating units with each unit of said system graphically positioned therein in scale dimensions and arranged in three-dimensional space in design position before each unit is to be interconnected into the system, forming a table of said dimensions significant of each unit and the points thereon to be linearly interconnected by the designer from any point in the plot plan common to said units in symbols recognizable by a draftsman, converting the measurement data of said table to coded form acceptable to a computer, feeding the computer with said coded data, executing programmed steps to impose constraining limits upon said computer to compute and store data representative of said points in the memory of said computer, programming said computer to sum up significant unitary piping data to count units of piping, their lengths, size, weight, cost or the like and to count connecting elements in each interconnecting pipe, valves, unions, elbows, T's or the like as emplaced in the memory of the computer, executing programmed steps to mathematically define the pipe interconnecting said units to be interconnected within said constraining limits, whereby each pipe thus defined becomes a limiting exclusion upon the next succeeding pipe, converting all of the data in the memory of said computer to visible form comprising a system of said units linearly interconnected through said points, and independently printing out a summation of said unitary piping data according to the summation thereof in the memory of the computer.

9. The method as defined in claim 7 wherein the computer is further programmed to sum up significant unitary piping data to count units of piping, their lengths, size, weight, cost or the like and to count connecting elements in each interconnecting pipe, valves, unions, elbows, T's or the like as emplaced in the memory of the computer, and, independently of other conversion of data in the memory of the computer to visible form, printing out a summation of said unitary piping data according to the summation thereof in the memory of the computer.

10. Means for mechanically designing and visibly illustrating a piping system interconnecting several separate operating units into a composite fluid processing system, comprising the combination of a programmed computer, said programmed computer being operative by a program stored therein to transpose draftsman's measurement data of units of said system arranged in a plot plan and draftsman's identification and specification data of elements of said system into coded form acceptable to said computer, computer data transferring means for emplacing said coded data in the memory of said computer and a printout means converting data stored and computed by said computer to visible form, said plot plan comprising a three-dimensional graphical arrangement with respect to a selected point available to several units of the system to be linearly interconnected by piping in three-dimensional space means red from said selected point, and further having marked thereon the points at which said units are to be interconnected, said coded data significant of orientation measurements of elements of said plot plan comprising said linear distances measured by the draftsman and identification and specification data of units emplaced in said system being first formed into tables of assembled data in symbols familiar to a draftsman, said measurement data being converted by the programming of said computer to coded form acceptable to the computer and emplaced in the memory of said computer through said data transferring means, said computer further having other programmed steps executed in its memory to impose constraining limits upon said coded data, whereby upon execution of the total programming in the memory of the computer, linear pathways significant of the piping in said system are defined interconnecting said points within said constraining limits, each linear pathway thus defined becoming a limiting exclusion upon the next succeeding linear pathway to ultimately convert the data in the memory of said computer to visible form comprising a piping system including said units linearly interconnected through said points.

11. The apparatus as defined in claim 10 including a cathode ray tube comprising a graphics system connected to said computer to print out and visually exhibit portions of said piping system in selected views, said cathode ray tube being sensitive to changes applied by a light pencil for correcting said drawings as coded into the memory of said computer whereby a corrected drawing to include corrections made in said graphics system may be ultimately printed out by said computer whereby a corrected illustration of said piping system is visibly formed by said system.

* * * * *

UNITED STATES PATENT OFFICE
CERTIFICATE OF CORRECTION

Patent No. 3,867,616 Dated February 18, 1975

Inventor(s) Theodore H. Korelitz et al.

It is certified that error appears in the above-identified patent and that said Letters Patent are hereby corrected as shown below:

Column 2, line 34, change [teh] to ---the---.

Column 3, line 36, change [cooded] to ---coded---.

Column 9, line 19, after "telephone" insert --- , telegraph ---.

Column 12, line 35, change [x] to ---X---.

Column 15, about line 52, insert as a last column in the chart, a ---B--- should be inserted at the end of each row.

Column 16, line 29, add "ed" to the word "present".

UNITED STATES PATENT OFFICE

CERTIFICATE OF CORRECTION

Patent No. 3,867,616 Dated February 18, 1975

Inventor(s) Theodore H. Korelitz et al.

It is certified that error appears in the above-identified patent and that said Letters Patent are hereby corrected as shown below:

Column 17, line 7, change [pipe] to ---piece---.

Column 17, line 19, change [described] to ---detected---.

Column 19, line 15, change [is] to ---if---.

Column 19, line 38, change [ $(Xmin)_L$ - $_{XBL}$ - $D/^2$ - 3 ] to ---$(Xmin)_L = X_{BL} - D/2 - 3$---.

Column 19, line 48, change the [ + ] before the figure "248.0" to --- = ---.

Column 19, line 49, take out the [ / ] in "$(Y/min)_L$".

Column 19, line 52, take out [32] before "$Z_{BL}$" and insert --- = ---.

Column 19, line 54, change [$_D/2$] to "D/2".

Column 21, line 37, after the word "numerical" insert ---identifying---.

UNITED STATES PATENT OFFICE

CERTIFICATE OF CORRECTION

Patent No. 3,867,616 Dated February 18, 1975

Inventor(s) Theodore H. Korelitz et al.

It is certified that error appears in the above-identified patent and that said Letters Patent are hereby corrected as shown below:

Column 22, line 12, change [reprocessing] to ---preprocessing---.

Column 22, line 17, change [hose] to ---host---.

Column 22, line 45, after the word "input" insert ---processing---.

Column 29, line 11, change [the] to ---That---.

Column 30, line 59, change [pumched] to ---punched---.

Signed and Sealed this

*fifth* Day of *August 1975*

[SEAL]

*Attest:*

RUTH C. MASON
*Attesting Officer*

C. MARSHALL DANN
*Commissioner of Patents and Trademarks*